(12) United States Patent
Shibazaki et al.

(10) Patent No.: US 6,999,119 B1
(45) Date of Patent: Feb. 14, 2006

(54) IMAGE-CAPTURING ELEMENT, IMAGE-CAPTURING CIRCUIT FOR PROCESSING SIGNAL FROM IMAGE-CAPTURING ELEMENT, IMAGE-CAPTURING DEVICE, DRIVING METHOD OF IMAGE-CAPTURING ELEMENT

(75) Inventors: Kiyoshige Shibazaki, Higashimurayama (JP); Masahiro Suzuki, Inzai (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/435,824

(22) Filed: Nov. 8, 1999

Related U.S. Application Data

(63) Continuation-in-part of application No. 09/288,654, filed on Apr. 9, 1999.

(30) Foreign Application Priority Data

| Apr. 10, 1998 | (JP) | ................................. 10-116266 |
| Apr. 10, 1998 | (JP) | ................................. 10-116267 |
| Apr. 10, 1998 | (JP) | ................................. 10-116268 |
| Aug. 19, 1998 | (JP) | ................................. 10-249198 |
| Nov. 9, 1998  | (JP) | ................................. 10-317896 |

(51) Int. Cl.
*H04N 3/14* (2006.01)
*H04N 5/235* (2006.01)

(52) U.S. Cl. ..................... 348/273; 348/280; 348/230.1

(58) Field of Classification Search ............. 348/220.1, 348/230.1, 272, 273, 274, 277, 278, 279, 348/280, 317, 320, 322
See application file for complete search history.

(56) References Cited

U.S. PATENT DOCUMENTS

| 4,775,885 | A  | * | 10/1988 | Sato et al. ................... 348/280 |
| 4,939,573 | A  | * | 7/1990  | Teranishi et al. ........... 348/276 |
| 5,956,086 | A  | * | 9/1999  | Sawanobori ................. 348/273 |
| 6,198,507 | B1 | * | 3/2001  | Ishigami ..................... 348/273 |
| 6,496,224 | B2 | * | 12/2002 | Ueno ......................... 348/322 |
| 6,529,236 | B1 | * | 3/2003  | Watanabe .................... 348/317 |
| 6,686,960 | B2 | * | 2/2004  | Iizuka ........................ 348/273 |

* cited by examiner

*Primary Examiner*—Wendy R. Garber
*Assistant Examiner*—Luong T. Nguyen
(74) *Attorney, Agent, or Firm*—Oliff & Berridge, PLC

(57) ABSTRACT

An image-capturing element comprises: a plurality of pixels provided in a matrix each of which has a photoelectric conversion element; a plurality of color filters each of which is provided at one of the plurality of pixels; and a read out circuit that adds together electrical charges of pixels within every specific range among the plurality of pixels and enables a sequential read out of added electrical charges.

17 Claims, 30 Drawing Sheets

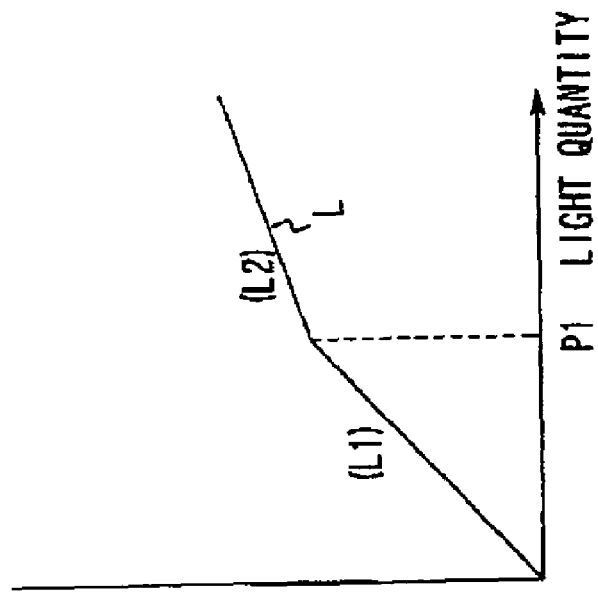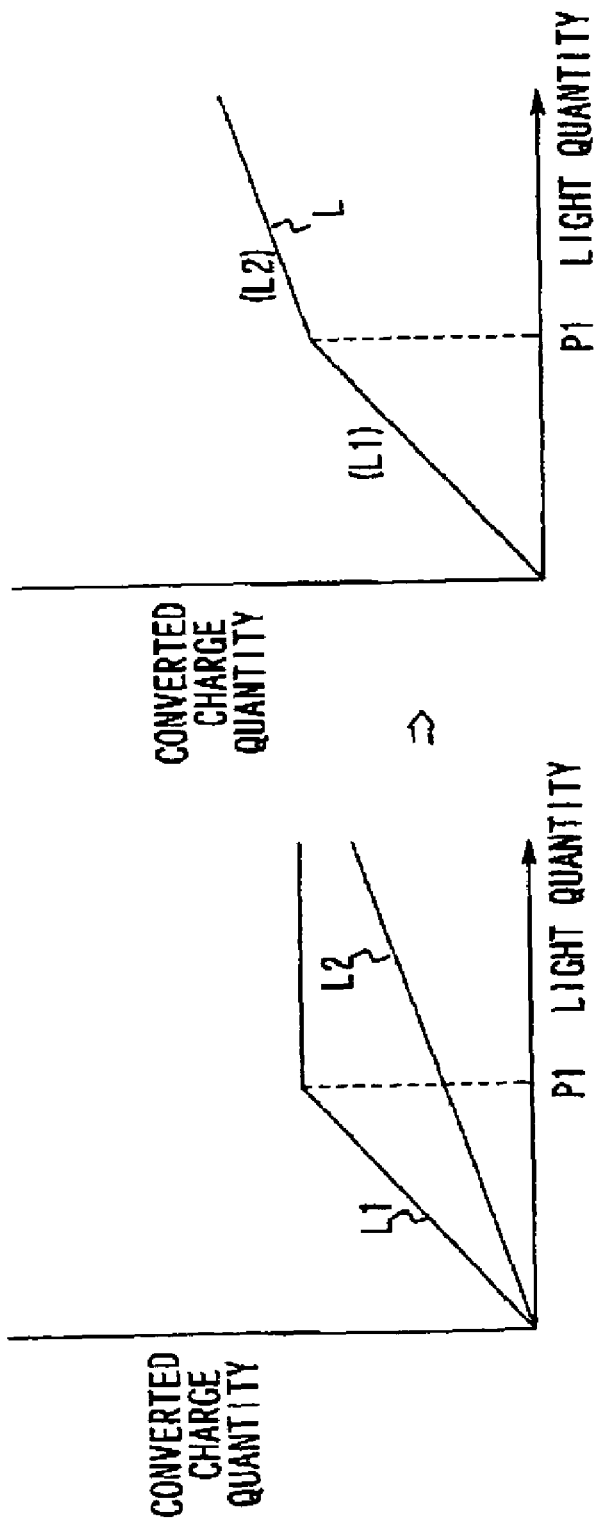

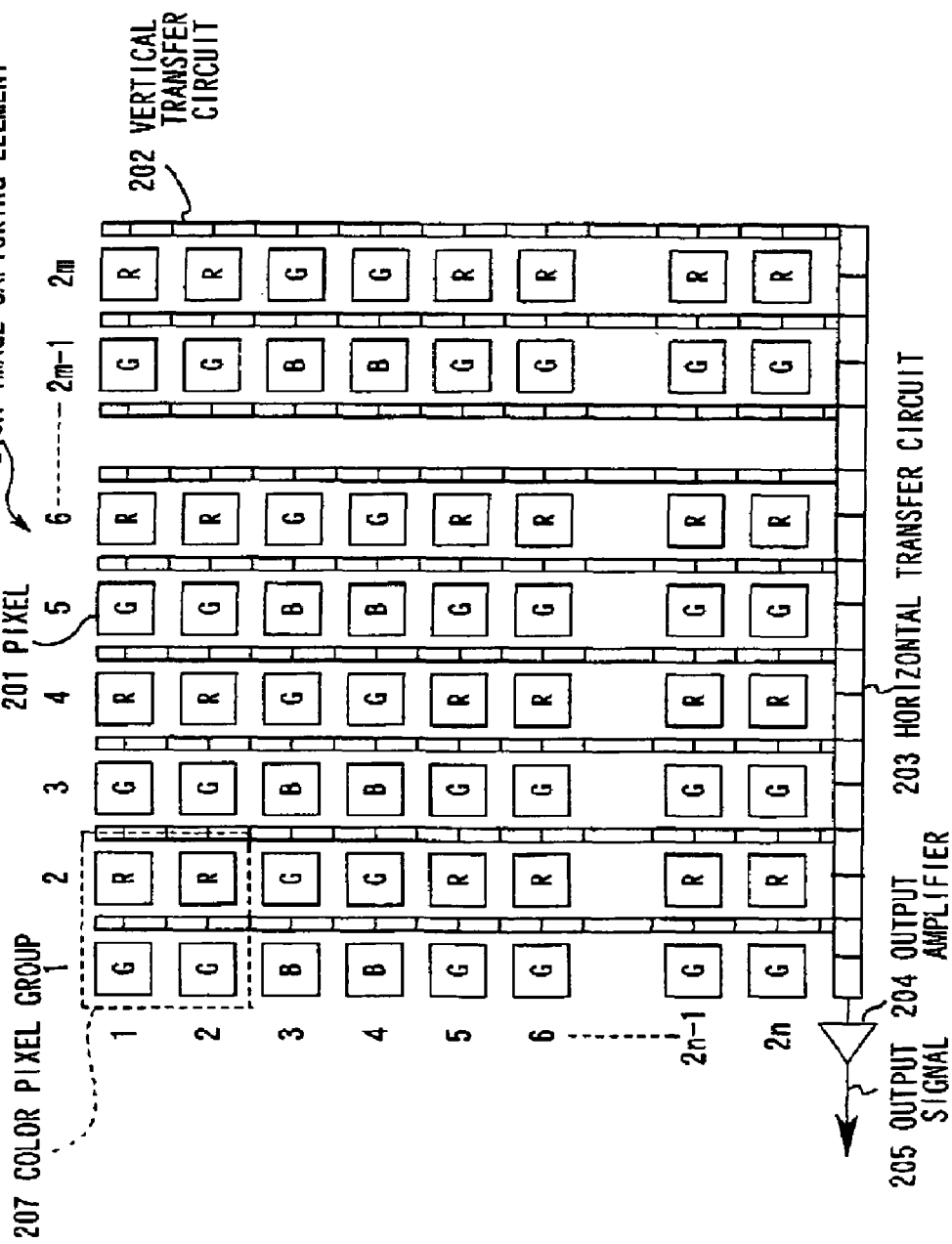

Related Art

FIG. 37

```
     506                510              501    501
      )                  ↓                )    /
   ┌─────                               ┌──
   │GGGG RRRRGGGGRRRRGGGGRRRRGGGG
   │GGGG RRRRGGGGRRRRGGGGRRRRGGGG
   │GGGG RRRRGGGGRRRRGGGGRRRRGGGG
   │GG┌GG RR┐RGGGGRRRRGGGGRRRRGGGG
   │GG│GG RR│RGGGGRRRRGGGGRRRRGGGG
   │GG│GG RR│RGGGGRRRRGGGGRRRRGGGG
   │BB│BG G│GBBBBGGGGBBBBGGGGBBBB ── 501
507─│BB│BG G│GBBBBGGGGBBBBGGGGBBBB
   │BB│BG G│GBBBBGGGGBBBBGGGGBBBB
   │BBBBGGGGBBBBGGGGBBBBGGGGBBBB
   │BBBBGGGGBBBBGGGGBBBBGGGGBBBB
   │BBBBGGGGBBBBGGGGBBBBGGGGBBBB
   │GGGGRRRRGGGGRRRRGGGGRRRRGGGG
   │GGGGRRRRGGGGRRRRGGGGRRRRGGGG
   │GGGGRRRRGGGGRRRRGGGGRRRRGGGG
   │GGGGRRRRGGGGRRRRGGGGRRRRGGGG
   │GGGGRRRRGGGGRRRRGGGGRRRRGGGG
   │GGGGRRRRGGGGRRRRGGGGRRRRGGGG
                    ⋮
```

IMAGE-CAPTURING ELEMENT, IMAGE-CAPTURING CIRCUIT FOR PROCESSING SIGNAL FROM IMAGE-CAPTURING ELEMENT, IMAGE-CAPTURING DEVICE, DRIVING METHOD OF IMAGE-CAPTURING ELEMENT

This is a continuation-in-part of U.S. patent application Ser. No. 09/288,654 filed Apr. 9, 1999.

INCORPORATION BY REFERENCE

The disclosures of the following priority applications are herein incorporated by reference:

Japanese Patent Application NO. 10-116266 filed Apr. 10, 1998

Japanese Patent Application No. 10-116267 filed Apr. 10, 1998

Japanese Patent Application No. 10-116268 filed Apr. 10, 1998

Japanese Patent Application No. 10-249198 filed Aug. 19, 1998

Japanese Patent Application No. 10-317896 filed November 9, 1998

BACKGROUND OF THE INVENTION

1. Field of the Invention

The present invention relates to an image-capturing element, an image-capturing circuit for processing an image-capture signal provided by an image-capturing element, an image-capturing device employing the image-capturing element and/or the image-capturing circuit, and a driving method of the image-capturing element.

2. Description of the Related Art

When obtaining a black and white image using an image-capturing element that captures a color image via primary color filters, i.e. red (R), green (G) and blue (B) color filters, or via complementary color filters, i.e., cyan (C), magenta (M) and yellow (Y) color filters in the prior art, a specific arithmetic operation for calorimetric system conversion is used on the primary color or complementary color element values of the individual pixels constituting the color image that has been obtained. In other words, in a manner similar to that adopted when achieving a color image, the image-capturing element outputs an image-capture signal and a specific conversion formula is used with a signal processing circuit or a signal processing software program on the output results to then convert the image-capture signal to a black and white image for output.

For instance, when converting a color image constituted of R, G and B elements to a black and white image, the color image is converted to a brightness Y in the YIQ colorimetric system adopted in the NTSC method. This conversion is expressed as;

$Y = 0.299R + 0.58G + 0.114B$, and is achieved by a signal processing circuit or a signal processing software program.

However, when a signal processing circuit converts the color image described above to a black and white image, a problem arises in that black and white image output cannot be obtained promptly since the color image-capture signal must first undergo A/D conversion to become converted to a digital signal, which must then be temporarily stored in memory and a significant length of time is required for the arithmetic operation in signal processing performed by the signal processing circuit or in the signal processing software to convert the color image to a black and white image.

In particular, in the case of an electronic camera that performs such processing, due to the fact that the black and white images cannot be output at high speed, high speed continuous photographing (continuous shooting) cannot be achieved.

In addition, in some color electronic cameras employing an IT-CCD (interline transfer CCD), electrical charges stored at pixels provided vertically adjacent to each other are added to double the electrical charge signal quantity. This achieves an improvement in sensitivity.

However, it is necessary to further increase the number of pixels to improve the sensitivity by adding the electrical charges at the pixels while maintaining the resolution at a specific level or higher using primary color filters i.e., red (R), green (G) and blue (B) filters and, at the same time, an increase in the number of pixels causes a problem in that the quantity of electrical charge that can be handled by each pixel is reduced due to restrictions related to the layout of the pixels and the electrical charge transfer path resulting in a reduced degree of sensitivity and a reduction in the dynamic range of the photoelectric conversion.

In addition, there are image-capturing devices having color filters with varying spectral transmittance characteristics provided at pixels at specific positions, which add together the pixel electrical charges and read out the results of the addition to obtain a color image using color filters with complementary color components.

Furthermore, there are image-capturing devices having color filters achieving the same spectral transmittance characteristics provided at pixels at specific positions, which add together the pixel electrical charges and read out the results of the addition to obtain a color image using color filters with primary color components.

However, a problem exists in that the electrical charge quantity that may be handled by a pixel on an image-capturing element. i.e., by a photoelectric conversion element, is within the range between the dark current level and the saturation level, and that, with this range greatly affecting the dynamic range of the photoelectric conversion characteristics, image-capturing cannot be achieved over a wide dynamic range.

In this case, even if the spectral transmittance factors at the color filters are increased to ultimately increase the sensitivity by increasing the electrical charge quantities, the dynamic range remains unchanged, and also, even if the spectral transmittance factors at the color filters are reduced to lower the sensitivity by reducing the electrical charge quantities, the dynamic range itself, likewise, remains unchanged.

In addition, a certain type of correlated double sampling (CDS) circuit or the like is connected to a two-dimensional solid image-capturing element such as a CCD, to reduce the reset noise, the output amplifier noise and the like of the two-dimensional solid image-capturing element included in the output signal from the two-dimensional solid image-capturing element.

In FIG. 25, which illustrates the structure of a CDS circuit in the prior art, the electrical charge that has undergone photoelectric conversion and has been transferred at an image-capturing element 401 is output as an image-capturing signal to a clamp circuit 406 via a buffer amplifier 402. The clamp circuit 406 outputs the output from the buffer amplifier 402 via a coupling capacitor 403, and also applies a voltage provided by a DC voltage source 405 to the output side of the coupling capacitor 403 by closing a switch 404 with the timing of a timing pulse øp. Thus, the image-capture signal from the coupling capacitor 403 is clamped at the field-through level to remove the reset noise, the output amplifier noise and the like mentioned above.

The image-capture signal output from the clamp circuit 406 is then output to a sample hold circuit 410 via a buffer amplifier 407. The sample hold circuit 410 samples the image-capture signal provided by the buffer amplifier 407 using a clamp pulse øs input to a switch 408, and outputs the level of the signal held at a holding capacitor 409 as an image-capture signal. Next, the image-capture signal indicating the signal level output by the sample hold circuit 410 is output via a buffer amplifier 411, is subsequently converted to a digital signal at an A/D converter (not shown) and desired image data that have undergone various types of signal processing are output.

Next, in reference to the timing chart in FIGS. 26A through 26C, the operation of the CDS circuit in FIG. 25 is explained. The image-capture signals output by the image-capturing element 401 via the buffer amplifier 402 are sequentially transferred and output as electrical charge signals that are achieved through conversion implemented by the individual photoelectric conversion elements at the image-capturing element 401 as indicated by the waveform of the image-capturing element output in FIG. 26A. In the image-capturing element output, the electrical charge quantity increases in units of pixels after the image-capturing element 401 is reset (R) and becomes stabilized at a signal level LL. After the reset (R), the clamp pulse øp is applied between a time point tt1 and a time point tt2, and the image-capturing element output is clamped at a field-through level LS that has been applied to match a reference level in which the noise is removed. After this, the signal level LL after clamping is sampled using the timing pulse øs during the time period elapsing from a time point tt3 to a time point tt4, and the signal level LL that has been held is output as an image-capture signal. In other words, the signal level LL relative to the field-through level LS is output.

Now, the output of the image-capturing element may be output with the electrical charge signal added at a floating diffusion amplifier (FDA) provided at the last stage of the image-capturing element to achieve an improvement in the sensitivity of the electrical charge signal and the like.

In such a case, two different signal outputs are output after a single reset, as illustrated in FIG. 20, which is to be detailed later, and a CDS circuit in the prior art presents a problem in that since it is capable of sampling only one electrical charge achieved through addition (or a single electrical charge that does not result from addition), the two different output electrical charges cannot be utilized effectively.

In addition, in order to obtain high resolution black and white (monochrome or monotone) images by employing an image-capturing element capable of obtaining color images through an image-capturing operation performed via primary color filters having color components, green (G), red (R) and blue (B), various types of interpolation processing are performed on pixel signals representing the individual color components that have been obtained to achieve a black and white image output.

For instance, a high resolution black and white image output is achieved through interpolation processing in which red (R) pixel signals and blue (B) pixel signals having undergone white balance processing are added and averaged or only green (G) pixel signals are used to be add and averaged for adjacent pixels in the horizontal and vertical directions.

However, the so-called "jaggies" may occur, in which fine lines and boundaries of colors in the image become jagged due to characteristics of the interpolation processing in a high resolution black and white image output obtained through the interpolation processing described above. In addition, jaggies may occur also due to a shift in the white balance. In either case, a poor black and white image with jaggies is output.

Furthermore, in order to obtain a high resolution black and white image through the interpolation processing described above, a dedicated signal processing circuit must be provided or it is necessary to install a special software program to perform the interpolation. The result is an increase in the scale of the circuit or an increase in the number of installed software programs. In either case, a great deal of time and effort is required and further miniaturization and further reduction in the weight of the image-capturing device are hindered.

SUMMARY OF THE INVENTION

The first object of the present invention is to provide an image-capturing element in which both color image and black and white image can be captured with the identical image-capturing element by appropriately adding pixels and also capturing of black and white images can be performed at high speed, and an image-capturing device employing such an image-capturing element.

The second object of the present invention is to provide an image-capturing element that has a high sensitivity and an improved wide dynamic range achieved by appropriately adding pixels, and an image-capturing device employing such an image-capturing element.

The third object of the present invention is to provide an image-capturing element that can obtain an image-capture signal that has a wide dynamic range achieved by appropriately adding pixels or the like, and an image-capturing device employing such an image-capturing element.

The fourth object of the present invention is to provide an image-capturing circuit that can efficiently pick up two kinds of electric charge signals generated with addition of pixels at once and process them effectively, and an image-capturing device employing such an image-capturing circuit.

The fifth object of the present invention is to provide a driving method of an image-capturing element and an image-capturing device, which make it possible to obtain both a color image output and a black and white image output using a single image-capturing element by adding together pixels in an appropriate manner and to obtain a high resolution, high quality black and white image with a great degree of efficiency through a simple circuit structure.

In order to attain the above objects, an image-capturing element according to the present invention, comprises: a plurality of pixels provided in a matrix each of which has a photoelectric conversion element; a plurality of color filters each of which is provided at one of the plurality of pixels; and a read out circuit that adds together electrical charges of pixels within every specific range among the plurality of pixels and enables a sequential read out of added electrical charges.

In order to attain the first object, an image-capturing element according to the present invention, comprises: a plurality of pixels provided in a matrix each of which has a photoelectric conversion element. And a green color filter is provided at each of 2×c pixels, a blue color filter is provided at each of 1×c pixels and a red color filter is provided at each of remaining 1×c pixels within a range of 4×c pixels adjacent to each other vertically and horizontally among the plurality of pixels, the c representing a natural number. And also a read out circuit is further provided that adds electrical charges of the 4×c pixels adjacent to each other vertically and horizontally and enables a sequential read out of added electrical charges.

In this image-capturing element, preferably, the green color filter, the blue color filter and the red color filter each achieve predefined spectral characteristics to enable the read out circuit to read out a brightness signal by adding together electrical charges of the 4×c pixels adjacent to each other vertically and horizontally.

In order to attain the first object, an image-capturing device according to the present invention comprises: an image-capturing element having a plurality of pixels provided in a matrix each of which has a photoelectric conversion element, a green color filter being provided at each of 2×c pixels within a range of 4×c pixels adjacent to each other vertically and horizontally among the plurality of pixels, a blue color filter being provided at each of 1×c pixels within the range, and a red color filter being provided at remaining 1×c pixels within the range, and a read out circuit that adds electrical charges at the 4×c pixels adjacent to each other vertically and horizontally and enables a sequential read out of added electrical charges; and a drive circuit that provides the read out circuit with a drive signal to enable the read out circuit to add electrical charges of the 4×c pixels adjacent to each other vertically and horizontally and enables a sequential read out of added electrical charges. It is to be noted that the c represents a natural number here In this image-capturing device, preferably, the image-capturing element has (d×m in a horizontal direction)×(e×n in a vertical direction) pixels; and the read out circuit, in response to the drive signal provided by the drive circuit, adds together electrical charges of d×e pixels adjacent to each other and enables a read out of (m in a horizontal direction)×(n in a vertical direction) pixel signals. It is to be noted that the m, n, d and e represents natural numbers here. Also, preferably, the image-capturing device further comprises: a selection unit that selects a mode for reading out the (m in a horizontal direction)×(n in a vertical direction) pixel signals or a mode for reading out the (d×m in a horizontal direction)×(e×n in a vertical direction) pixel signals without adding. Further, preferably, the green color filter, the blue color filter and the red color filter each achieve predefined spectral characteristics; and the read out circuit adds together electrical charges of the 4×c pixels adjacent to each other vertically and horizontally to read out a brightness signal.

In order to attain the second object, an image-capturing element according to the present invention, comprises: a plurality of pixels provided in a matrix each of which has a photoelectric conversion element. And color filters of a single color are provided at each group of a specific number of pixels lying adjacent to each other among the plurality of pixels; and a read out circuit is provided that adds together electrical charges of the specific number of pixels lying adjacent to each other and sequentially reads out added electrical charges.

In order to attain the second object, an image-capturing device comprises; an image-capturing element having a plurality of pixels provided in a matrix each of which has a photoelectric conversion element, color filters of a single color being provided at each group of a specific number of pixels lying adjacent to each other among the plurality of pixels, and a read out circuit that adds together electrical charges of the specific number of pixels lying adjacent to each other and enables a sequential read out of added electrical charges; and a drive circuit that provides the read out circuit with a drive signal to enable the read out circuit to add together electrical charges of the specific number of pixels lying adjacent to each other and enables a sequential read out of added electrical charges.

In this image-capturing, preferably, the image-capturing element has (d×m in a horizontal direction)×(e×n in a vertical direction) pixels; and the read out circuit, in response to the drive signal provided by the drive circuit, adds together electrical charges of d×e pixels adjacent to each other for a read out and enables a read out of (m in a horizontal direction)×(n in a vertical direction) pixel signals. It is to be noted that the m, n, d and e represent natural numbers Also, preferably, the image-capturing device further comprises: a selection unit that selects a mode for reading out the (m in a horizontal direction)×(n in a vertical direction) pixel signals or a mode for reading out the (d×m in a horizontal direction)×(e×n in a vertical direction) pixel signals without adding.

In order to attain the third object, an image-capturing element according to the present invention comprises: a plurality of pixels provided in a matrix each of which has a photoelectric conversion element; and a plurality of color filters each of which is provided at one of the plurality of pixels. And, among the plurality of color filters, color filters of a single color are provided for pixels within each specific range and the color filters within the specific range have different transmissivities.

In this image-capturing element, preferably, the color filters of the single color having different transmissivities from each other are provided adjacent to each other.

Also, preferably, pixels at which the color filters of the single color have different transmissivities have identical spectral characteristics.

In order to attain the third object, an image-capturing device according to the present invention, comprises: an image-capturing element having a plurality of pixels provided in a matrix each of which has a photoelectric conversion element, and a plurality of color filters being provided at the plurality of pixels respectively. The color filters are of a single color within each specific range, and the color filters within the specific range have different transmissivities. And the image-capturing element further has a read out circuit that adds together electrical charges of the pixels within the specific range and enables a sequential read out of added electrical charges. The image-capturing device further comprises a drive circuit that provides the read out circuit with a drive signal to enable the read out circuit to add together electrical charges of the pixels within the specific range and enables a sequential read out of added electrical charges.

In this image-capturing device, preferably, the color filters of the single color having different transmissivities are provided adjacent to each other; and the read out circuit adds together electrical charges corresponding to color filters of the single color having different transmissivities and reads out added electrical charges.

Another image-capturing device comprises: an image-capturing element having a plurality of pixels provided in a matrix each of which has a photoelectric conversion element, and a plurality of color filters being provided at the plurality of pixels respectively. The color filters are of a single color within each specific range and the color filters within the specific range have different transmissivities. The image-capturing element further having a read out circuit that enables a sequential read out of electrical charges of the pixels. The image-capturing device further comprises a drive circuit that provides the read out circuit with a drive signal to sequentially read out the electrical charges of the pixels within the specific range independently of each other.

Yet another image-capturing device according to the present invention comprises: an image-capturing element having a plurality of pixels provided in a matrix pattern each of which has a photoelectric conversion element, a plurality of color filters being provided at the plurality of pixels respectively, and a read out circuit that enables a sequential read out of electrical charge signals of the pixels; a drive circuit that provides the read out circuit with a drive signal to enable the read out circuit to add electrical charge signals obtained from pixels with color filters thereof lying adjacent to each other, being of a single color and having the same transmissivity and then to enable a read out of added electrical charge signals, and also to enable the read out circuit to independently read out electrical charge signals obtained from the pixels with color filters thereof lying adjacent to each other, being of a single color and achieving different transmissivities without adding the electrical charge signals together; and a signal processing device that converts signals obtained from adjacent single color pixels with different transmissivities to one brightness signal by synthesizing the signals while ensuring that the signals continuously change in correspondence to an incident light quantity.

Preferably, this image-capturing device further comprises: a selection unit that selects a first mode or a second mode. When the first mode is selected, the drive circuit provides the read out circuit with a drive signal to enable the read out circuit to add electrical charge signals obtained from pixels with color filters thereof lying adjacent to each other being of a single color and having the same transmissivity and then to read out added electrical charge signals and also to enable the read out circuit to enable reading out electrical charge signals obtained from pixels with color filters thereof lying adjacent to each other being of a single color and having different transmissivities independently of each other without performing addition. When the second mode is selected, the drive circuit provides the read out circuit with a drive signal to enable the read out circuit to generate a first added signal by adding together the electrical charge signals obtained from the pixels with the color filters thereof lying adjacent to each other being of a single color and having the same transmissivity, to enable the read out circuit to generate a second added signal by adding together the electrical charge signals obtained from the pixels with the color filters thereof lying adjacent to each other being of a single color and having different transmissivities, and also to enable the read out circuit to add the first added signal and the second added signal and enable a read out of an addition signal of the first added signal and the second added signal. When the second mode is selected, the signal processing device stops synthesizing processing.

In order to attain the fourth object, an image-capturing circuit according to the present invention is an image-capturing circuit for processing a signal provided by a solid image-capturing element. The solid image-capturing element has a pixel matrix which includes a plurality of pixels provided in a matrix each of which has a photoelectric conversion element. The solid image-capturing element reads out electrical charge signals from the pixel matrix by vertically transferring and horizontally transferring the electrical charges and adds together electrical charges of a plurality of pixels lying adjacent to each other in a horizontal direction in a horizontal transfer output. The image-capturing circuit comprises: a clamp circuit that clamps a feed through level of an output signal from the solid image-capturing element at a constant potential; and a plurality of sample hold circuits that sample and hold an output signal from the clamp circuit over a plurality of different periods.

In order to attain the fourth object, an image-capturing device according to the present invention comprises: an image-capturing optical system; a solid image-capturing element having a pixel matrix with a plurality of pixels provided in a matrix each of which has a photoelectric conversion element. The plurality of pixels receive an image light of a subject via the image-capturing optical system. The solid image-capturing element reads out electrical charge signals from the pixel matrix by vertically transferring and horizontally transferring the electrical charge signals and adds together electrical charge signals of a plurality of pixels adjacent to each other in the horizontal direction in a horizontal transfer output. The image-capturing device further comprises: a clamp circuit that clamps a feed through level of an output signal from the solid image-capturing element at a constant potential; a plurality of sample hold circuits that sample and hold an output signal from the clamp circuit over a plurality of different periods: and a drive circuit that provides the clamp circuit and the sample hold circuits with a drive signal.

In this image-capturing device, preferably, the pixel matrix has color filters of a single color for every four pixels adjacent to each other vertically and horizontally; the solid image-capturing element sequentially outputs an electrical charge signal at one of two pixels adjacent to each other in the horizontal direction and an added electrical charge signal achieved by adding together electrical charge signals of the two pixels adjacent to each other in the horizontal direction; and the plurality of sample hold circuits include two sample hold circuits, one for sampling and holding the electrical charge signal of one of the two pixels and another for sampling and holding the added electrical charge signal achieved by adding together the electrical charge signals of the two pixels.

Also, preferably, the image-capturing device further comprises: a switching circuit for selectively inputting an output of the clamp circuit to the plurality of sample hold circuits.

Also, preferably, the plurality of sample hold circuits are commonly connected to an output of the clamp circuit, sample an output of the clamp circuit during different time periods from each other and output in parallel a signal achieved by adding together electrical charge signals at a plurality of pixels of a single color adjacent to each other in the horizontal direction and a signal achieved without addition.

Also, preferably, the image-capturing device further comprises: a selection unit that selects a mode for outputting a electrical charge signal at one of two pixels adjacent to each other in the horizontal direction or a mode for outputting an added signal electrical charge achieved by adding together signal electrical charges at the two pixels adjacent to each other in the horizontal direction.

In order to attain the fifth object, a driving method according to the present invention is used for an image-capturing element that has $2 \times a \times m$ pixels along a horizontal direction and $2 \times b \times n$ pixels along a vertical direction arranged in a matrix. Each pixel has a photoelectric conversion element, the image capturing element has a color filter array in which color filters of a single color are arranged at every first pixel group that has 2×a pixels along a horizontal direction and 2×b pixels along a vertical direction adjacent to each other, a color arrangement of the color filters at every first pixel group achieves a Bayer array, and the a, b, m and n each representing a natural number. The driving method comprises: a step in which either a color image mode or a monochrome image mode is selected: a step in which driving of the image-capturing element is implemented to add together individual pixels in the first pixel group for readout when the color image mode is selected: and a step in which driving of the image-capturing element is implemented to add together individual pixels in an second pixel group achieved by shifting by "a" pixels in the horizontal direction and by "b" pixels in the vertical direction relative to a position of the first pixel group for readout when the monochrome image mode is selected.

Another driving method according to the present invention is used also for an image-capturing element that has a plurality of pixels arranged in a matrix. Each pixel has a photoelectric conversion element, the image capturing element has a color filter array in which color filters of a single color are arranged at every four pixels adjacent to each other in vertical and horizontal directions, a color arrangement of the color filters at every the four pixels achieves a Bayer array. The driving method comprises: a step in which either a color image mode or a monochrome image mode is selected; a step in which driving of the image-capturing element is implemented to add together the four pixels for readout when the color image mode is selected; and a step in which driving of the image-capturing element is implemented to add together other four pixels achieved by shifting by one pixel in the horizontal direction and by one pixel in the vertical direction relative to a position of the four pixels for readout when the monochrome image mode is selected.

An image-capturing device according to the present invention comprises: an image-capturing element that has 2×a×m pixels along a horizontal direction and 2×b×n pixels along a vertical direction arranged in a matrix. Each pixel has a photoelectric conversion element, the image capturing element has a color filter array in which color filters of a single color are arranged at every first pixel group that has 2×a pixels along a horizontal direction and 2×b pixels along a vertical direction adjacent to each other, a color arrangement of the color filters at every first pixel group achieves a Bayer array, and the a, b, m and n each representing a natural number. The image-capturing device further comprises; a switching device that selects either a color image mode or a monochrome image mode; and a drive control device that implements drive control of the image-capturing element to add together individual pixels in the first pixel group for readout when the color image mode is selected, and implements drive control of the image-capturing element to add together individual pixels in an second pixel group achieved by shifting by "a" pixels in the horizontal direction and by "b" pixels in the vertical direction relative to a position of the first pixel group for readout when the monochrome image mode is selected.

This image-capturing device preferably further comprises: a color image generating device that generates color image information by using an output signal from the image-capturing element when the color image mode is selected; and a monochrome image generating device that generates monochrome image information by using an output signal from the image-capturing element when the monochrome image mode is selected.

Another image-capturing device according to the present invention also comprises: an image-capturing element that has a plurality of pixels arranged in a matrix. Each pixel has a photoelectric conversion element, the image capturing element has a color filter array in which color filters of a single color are arranged at every four pixels adjacent to each other in vertical and horizontal directions, a color arrangement of the color filters at every the four pixels achieves a Bayer array. And the image-capturing device further comprises: a switching device that selects either a color image mode or a monochrome image mode; and a drive control device that implements drive control of the image-capturing element to add together the four pixels for readout when the color image mode is selected, implements drive control of the image-capturing element to add together other four pixels achieved by shifting by one pixel in the horizontal direction and by one pixel in the vertical direction relative to a position of the four pixels for readout when the monochrome image mode is selected.

BRIEF DESCRIPTION OF THE DRAWINGS

FIG. 12A illustrates the photoelectric conversion characteristics corresponding to individual pixels;

FIG. 12B illustrates the photoelectric conversion characteristics achieved through synthesis of signals of pixels having various transmissivities;

FIG. 16 illustrates the structure of the image capturing element in a variation of the third embodiment;

FIG. 37 presents an examples of color pixel groups constituted of 4×6=24 pixels.

DESCRIPTION OF THE PREFERRED EMBODIMENTS

First Embodiment

The following is an explanation of the first embodiment of the present invention given in reference to the drawings. The image-capturing element in the first embodiment makes it possible to capture both a color image and a black and white image with a single image-capturing element and also makes it possible to achieve high speed image-capturing for black and white images by performing appropriate addition of pixels.

Figure 1:
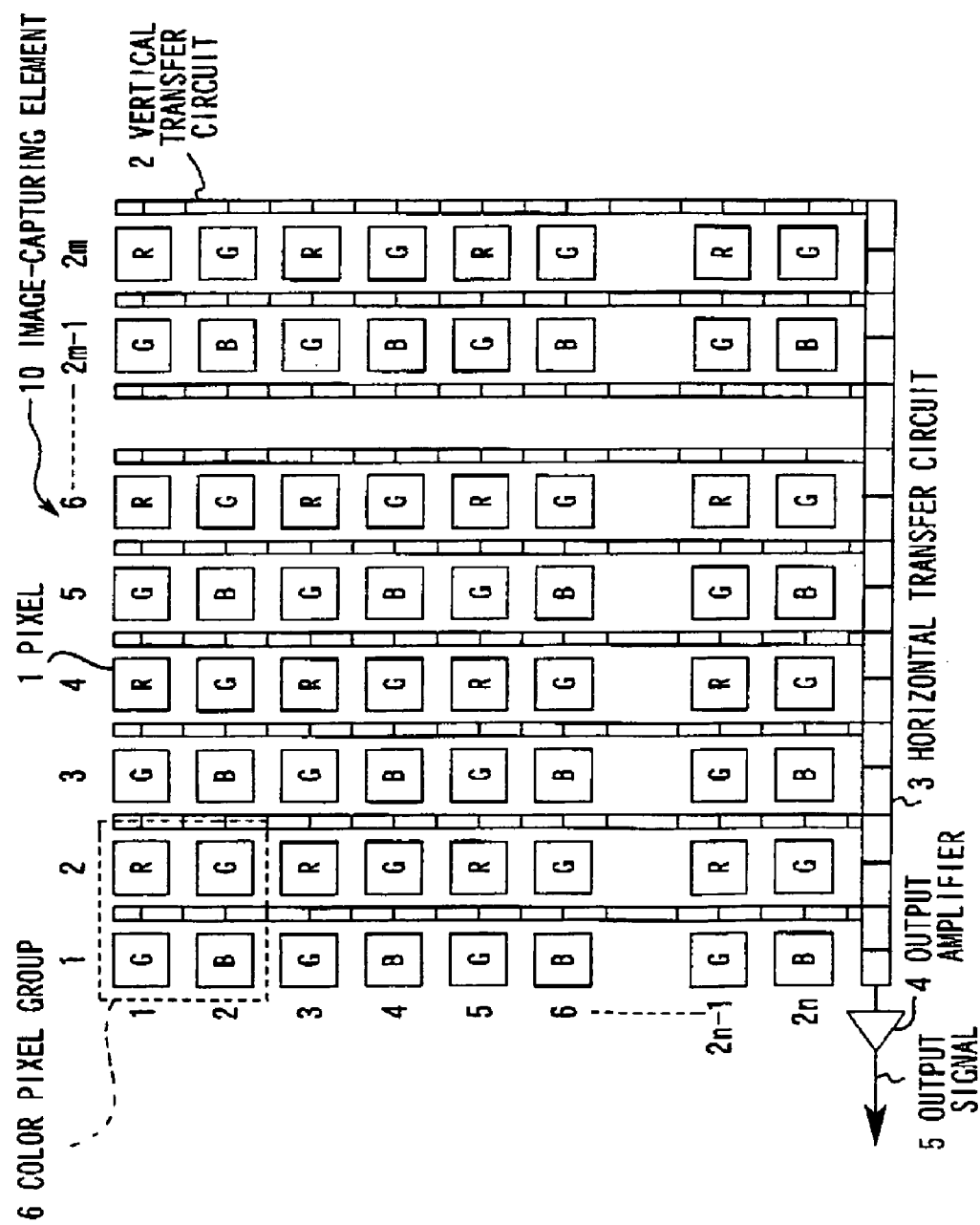
FIG. 1 illustrates the structure of the image-capturing element in a first embodiment of the present invention.

FIG. 1 illustrates the structure of the image-capturing element in the first embodiment. An image-capturing element 10 constitutes a color pixel matrix achieved by arraying a plurality of pixels 1, i.e., 2m pixels 1 in the horizontal direction (the direction of rows) and 2n pixels 1 in the vertical direction (the direction of columns). The color pixel matrix, which is achieved through an RGB Bayer array of R, C and B color pixels, is constituted of a plurality of color pixel groups 6, m of which are provided in the horizontal direction and n of which are provided in the vertical direction. Each color pixel group 6 in the ROB Bayer array is constituted of 2×2 pixels, i.e., 4 pixels 1, and in the color pixel group, a G color pixel, an R color pixel, a B color pixel and a G color pixel are provided adjacent to each other at the first row/first column, at the first row/second column, at the second row/first column and at the second row/second column respectively, for instance. The pixels 1, each having a photoelectric conversion element such as a photodiode, function as an R, G or B color pixel, and this function is achieved by providing a color filter that allows R, G or B light to be transmitted on the upper surface of each pixel 1. Consequently, the pixel 1 at the first row/first column, for instance, only allows G (green) light to be transmitted, and receives only the G light component to perform photoelectric conversion on it. It is to be noted that n and m are natural numbers.

It is to be noted that a pixel, as referred to in the context, represents a conceptual pixel that includes a photoelectric conversion element such as a photodiode, a storage portion for storing the electrical charge generated by the photoelectric conversion element and the color filter described above. For instance, the image-capturing element 10 may be constituted of a CCD solid image-capturing element.

When the image-capturing element 10 captures a color image, i.e., when the photographing mode in the electronic camera is set in the color mode (the photographing mode is to be detailed later), the electrical charges stored at the individual pixels 1 in the vertical direction are output in synchronization to vertical transfer circuits 2, and the electric charges output to the vertical transfer circuits 2 are sequentially transferred in synchronization to a horizontal transfer circuit 3 in units of single stages of electrical charges corresponding to the pixels 1 in the horizontal direction. In other words, the electric charges output to the vertical transfer circuits 2 are sequentially transferred in synchronization to a horizontal transfer circuit 3 stage by stage per electrical charges corresponding to the pixels 1 in the horizontal direction.

The horizontal transfer circuit 3, in turn, transfers and outputs the electrical charges corresponding to the pixels 1 provided in the horizontal direction via an output amplifier 4 as an output signal 5 one by one until all the electrical charges stored at the pixels 1 are taken out. Thus, since the series of electrical charges output as the output signal 5 achieves regularity whereby it is output in a repetitive manner with electrical charges corresponding to B, G, B, G, . . . pixels, output at the first stage, electrical charges corresponding to G, R, G, R. . . . pixels output at the next stage and electrical charges corresponding to B. G, B, G, . . . pixels output at the following stage until electrical charges corresponding to G, R, G, R, . . . pixels are output at the last stage, an R G B color image corresponding to the array of the color pixel groups 6 is generated.

In particular, by adopting such an RGB Bayer array, the conversion from the RGB calorimetric system to the YIQ calorimetric system adopted in the NTSC method is facilitated. In other words, the YIQ calorimetric system, which is expressed using the brightness Y and color differences I and Q corresponding to the black and white image, achieves the following conversion relationship with the RGB colorimetric system. Namely,

Y=0.299 R+0.587 G+0.144 B

I=0.596 R−0.274 G−0.322 B and

Q=0.211 R−0.522 G+0.311 B;

and the color differences I and Q may be further transformed as follows;

I=0.596 (R−G)+0.322 (G−B), and

Q=0.211 (R−G)−0.311 (G−B)

Thus, as long as the differences between R and G and between G and B can be calculated, the color differences I and Q can be determined with ease. Since the B and C are provided adjacent to each other and G and R are provided adjacent to each other within a color pixel group 6 and they are transferred and output adjacent to each other in the RGB Bayer array, the calculation mentioned above can be performed with ease.

Now, when the image-capturing element 10 is to capture a black and white image as characterized in the present invention, i.e., when the photographing mode in the electronic camera is set to the black and white mode, the electrical charges stored at the four individual pixel within each color pixel group 6 are added together on the image-capturing element 10 so that the output signal 5 which adopts a mode in which single electrical charges, each achieved through such addition of the electrical charges at a color pixel group are sequentially transferred adjacent to each other.

Figure 3:
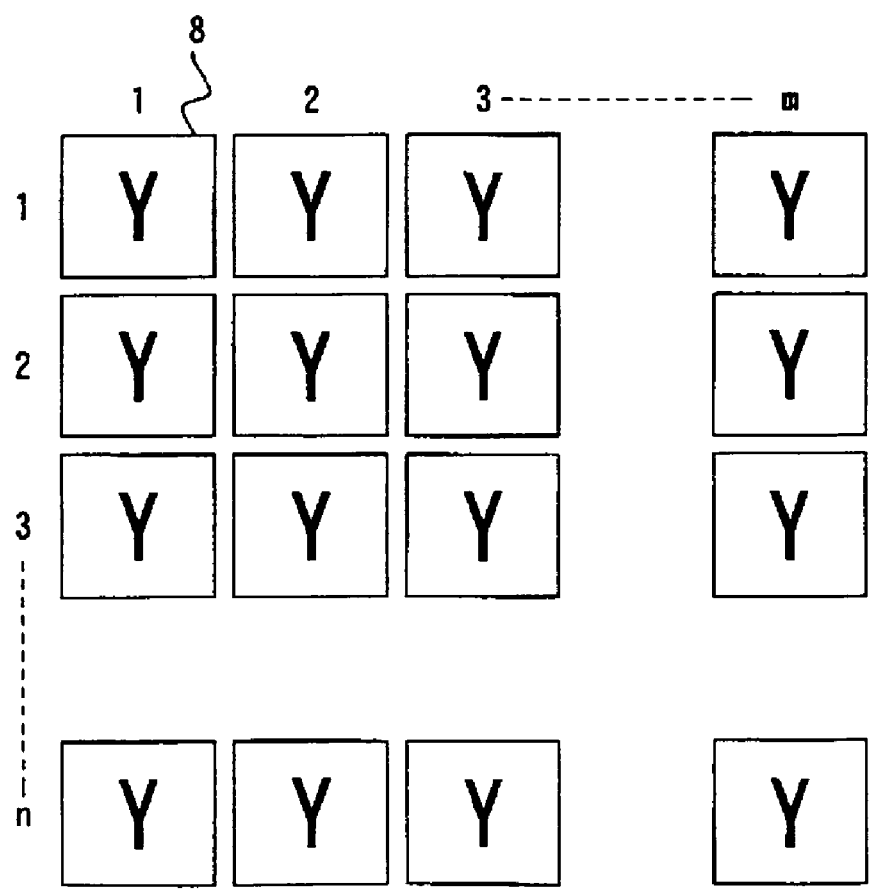
FIG. 3 illustrates a black and white image obtained through addition in a color pixel matrix.

In addition, the spectral characteristics of the individual R, G and B color filters are set to ensure that the outputs of the individual color components of the four pixels in each color pixel group 6 achieves a ratio in which a ratio of ((the 1 R pixel): (the 2 G pixels): (the 1 B pixel)) equals to a ratio of (0.299: 0.587: 0.144). Consequently, with the electrical charge achieved through the addition performed within each color pixel group 6 corresponding to the brightness Y in the YIQ calorimetric system, a brightness (Y) signal corresponding to the arrangement of color pixel groups 6 is output as the output signal 5 from the image-capturing element 10, and addition pixels 8 in the m×n matrix indicate the individual pixels of the black and white image (see FIG. 3).

In this case, since the electrical charge quantity at each addition pixel 8 is larger than the electrical charge quantities at individual single pixels, a black and white image with a high degree of sensitivity can be obtained.

Now, the following modes may be adopted for the addition performed on the image-capturing element 10. An explanation is given on them in reference to FIGS. 1 and 2.

In the first mode, two pixels 1a and 1b (G and B) adjacent to each other along the longitudinal column within the color pixel group 6 are added together at the vertical transfer circuit 2. Likewise, two pixels 1c and 1d (R and G), too, are added together at the vertical transfer circuit 2. Then, the sums of these pixels added together are further added together at the output amplifier 4.

In the second mode, the two pixels 1a and 1b along the longitudinal column within the color pixel group 6 are added together when they are transferred to the horizontal transfer circuit 3. Likewise, the two pixels 1c and 1d are added together when they are transferred to the horizontal transfer circuit 3. The sums of these pixels added together are then further added together at the output amplifier 4.

In the third mode, the electrical charges at the four individual pixels are output only to the vertical transfer circuit 2 present between the two longitudinal columns along which the four pixels 1a, 1b, 1c and 1d are provided within the color pixel group 6. At this time, the pixels 1a and 1c along the lateral row are added together at the vertical transfer circuit 2, the pixels 1b and 1d along the other lateral row are added together at the vertical transfer circuit 2 and then the addition pixels along one longitudinal column that are achieved by adding together the individual pixels are further added together at the vertical transfer circuit 2.

Such addition performed on the image-capturing element 10 may be achieved easily by controlling the drive for the electrical charge transfer in the image-capturing element 10.

Figure 2:
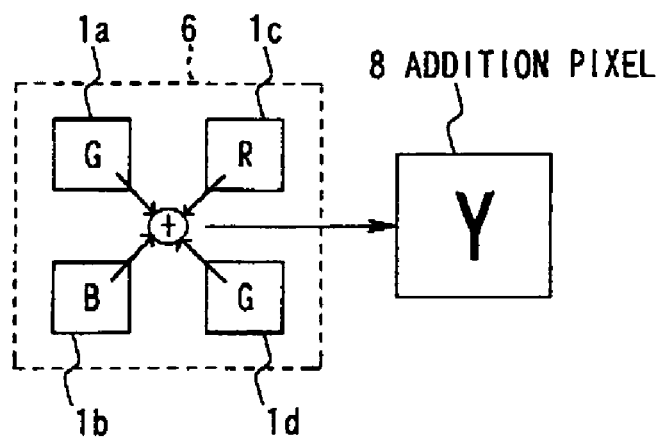
FIG. 2 illustrates the principle of obtaining a black and white image through addition in a color pixel matrix.

The first addition mode that may be adopted in the color pixel group 6 in FIGS. 1 and 2, for instance, is now explained. First, an electrode is driven to output the G pixel 1a at the first row/first column to the vertical transfer circuit 2. Next, an electrode is driven to implement vertical transfer of the electric charge at the G pixel 1a within the vertical transfer circuit 2. Next, an electrode is driven to output the B pixel 1b to the vertical transfer circuit 2 when the electrical charge at the G pixel 1a reaches the position next to the B pixel 1b at the second row/first column. This causes the electrical charges at the G pixel 1a at the first row/first column and the B pixel 1b at the second row/first column to be added together at the vertical transfer circuit 2. The R pixel 1c at the first row/second column and the G pixel 1d at the second row/second column are added together in a similar manner.

Then, the added electrical charges achieved by adding together the pixels in the first column and by adding together the pixels in the second column are vertically transferred to the horizontal transfer circuit 3. At the horizontal transfer circuit 3, the added electrical charges are transferred horizontally toward the output amplifier 4. At the input stage of the output amplifier 4, the electrodes are controlled so that the added electrical charge achieved by adding together the pixels in the first column is first transferred to the output amplifier 4 and then the added electrical charge achieved by adding together the pixels in the second column successively floats therein. In this manner, at the input stage of the output amplifier 4, the added electrical charge (1a+1b) achieved by adding together the pixels in the first column and the added electrical charge (1c+1d) achieved by adding together the pixels in the second column are further added together (1a+1b+1c+1d). AS a result, the output amplifier 4 obtains an output signal 5 achieved by adding together the four pixels 1a, 1b, 1c and 1d.

It is to be noted that the other addition modes may be achieved by adopting various combinations of the timing with which outputs are performed from the individual pixels to the vertical transfer circuits 2, the timing with which the vertical transfer is performed within the vertical transfer circuits 2, the timing with which transfer is performed from the vertical transfer circuits 2 to the horizontal transfer circuit 3, the timing with which the horizontal transfer is performed within the horizontal transfer circuit 3, the timing with which the electrical charges are stored at the input stage of the output amplifier 4 and the like.

Since, when the image-capturing element 10 outputs the output signal 5, the four pixels within each color pixel group 6 are added together so that a virtual addition pixel 8 corresponding to a brightness signal is directly output as the output signal 5 as described above, a black and white image can be immediately obtained without having to perform any subsequent arithmetic operation on the R, G and B color components within the individual color pixel groups 6.

Namely, since the single image-capturing element 10 can directly output signals corresponding to a color image and a black and white image, the subsequent processing load and the length of time required for the subsequent processing can be reduced, and at the same time, since the black and white image is constituted by adding together the electrical charges, a high sensitivity signal output is achieved.

In addition, the continuous photographing shutter intervals for photographing black and white images can be greatly reduced in an electronic camera employing the image-capturing element 10 described above to realize a high speed black and white image continuous photographing function. For instance, the shutter intervals that are 6 to 7 seconds in the prior art can be reduced to 2 seconds.

It is to be noted that while the color pixel matrix within the image-capturing element 10 explained above adopts the Bayer array, the present invention is not limited to this array and any mode may be adopted in regard to the array of the color components R, G and B pixels within the individual color pixel groups 6.

Furthermore, while the explanation above is given on the premise that the image-capturing element 10 is a CCD solid image-capturing element, the present invention is not limited to this example and it is obvious that the present invention may be adopted in an amplifier type solid image-capturing element that takes out the electrical charges stored at the individual pixels 1 through switching processing performed on the pixels 1.

Figure 4:
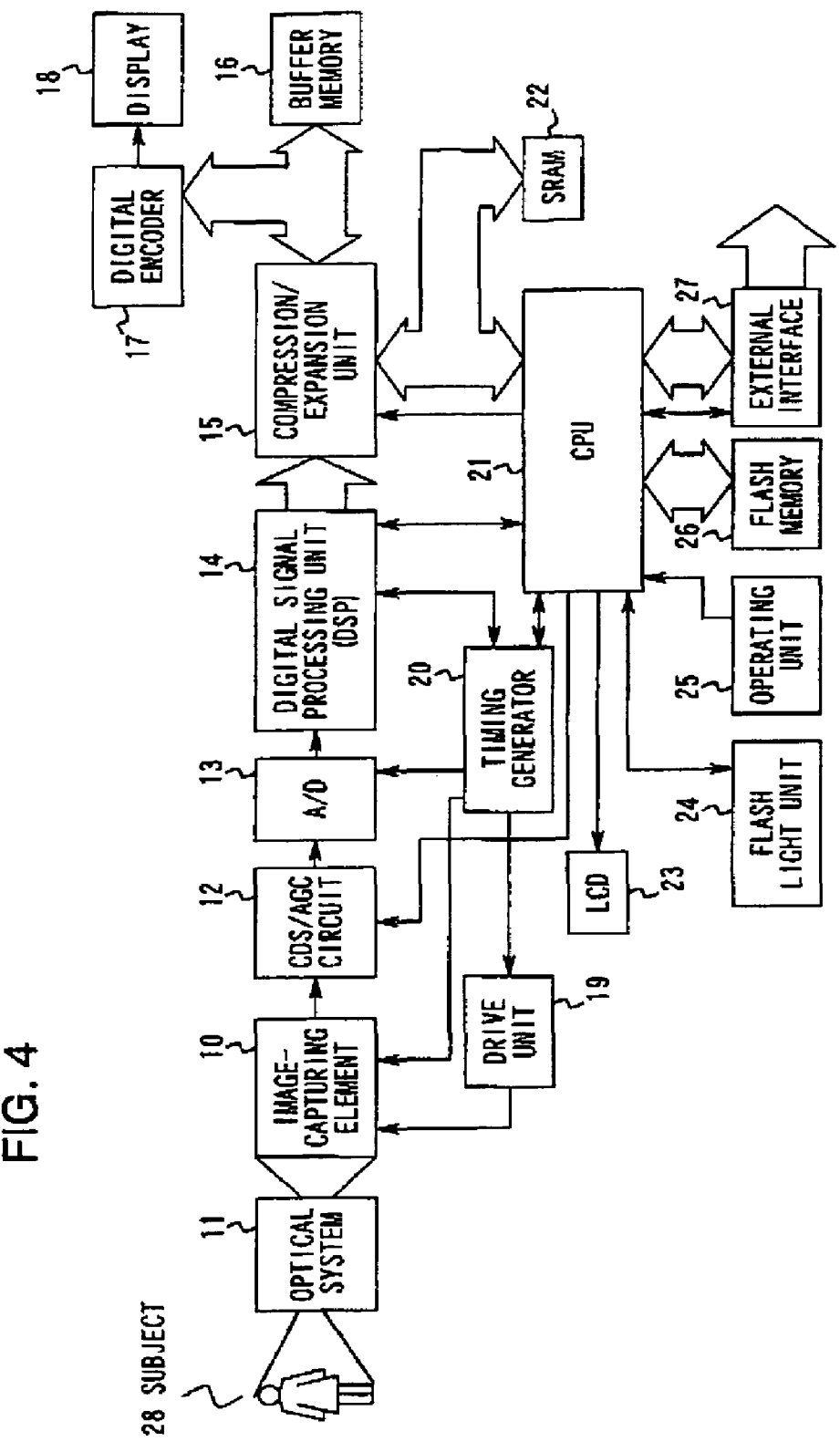
FIG. 4 is a block diagram illustrating the structure of an electronic camera employing the image-capturing element illustrated in FIG. 1.
Figure 5:
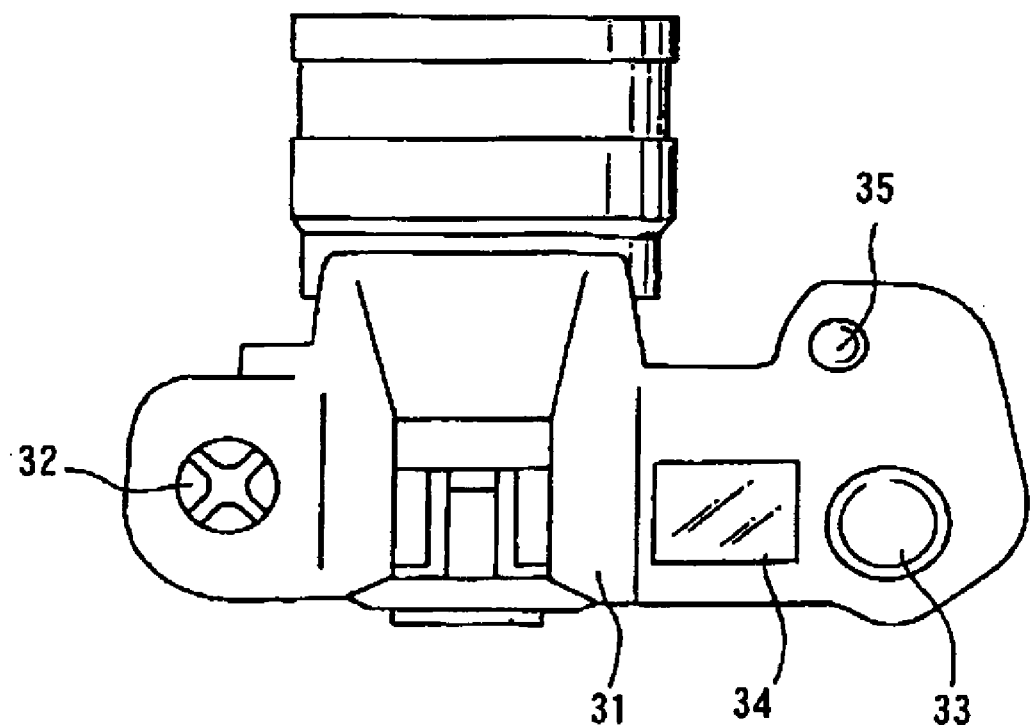
FIG. 5 is a schematic plan view of the electronic camera in FIG. 4.

Next, an electronic camera that functions as an image-capturing device employing the image-capturing element 10 illustrated in FIG. 1 is explained in reference to FIGS. 4 and 5.

FIG. 4 is a block diagram illustrating the structure of an electronic camera employing the image-capturing element 10. In FIG. 4, the image-capturing element 10 converts an image of a subject 28 input via an optical system 11 to an electrical signal. The optical system 11 is provided with an infrared blocking filter.

A CDS/AGC circuit 12 imparts its CDS effect whereby the noise component is reduced through correlated double sampling and the like and its AGC effect whereby automatic amplification is implemented in correspondence to the sensitivity to the output signal from the image-capturing element 10, and outputs the resulting signal to an A/D converter 13.

The A/D converter 13 then converts the analog signal provided by the CDS/AGC circuit 12 to a 10-bit digital signal and outputs the digital signal to a digital signal processing unit (DSP) 14. It goes without saying that the A/D converter 13 may convert the analog signal provided by the CDS/AGC circuit 12 to a digital signal having more than 10 bits.

The DSP 14 is a signal processing circuit that performs processing such as image interpolation processing, black level adjustment, gamma correction and knee correction on the 10-bit digital data that have been input, performs processing such as matrix processing and contour correction on the digital data obtained through conversion from the 10-bit digital data to 8-bit digital data, and performs processing such as generation of 16-bit digital data comprising an 8-bit brightness component and an 8-bit color difference component. The DSP 14 is constituted of a one-chip LSI for digital signal processing. In addition, the DSP 14 also engages in the timing pulse generation processing for driving the image-capturing element 10.

A compression/decompression unit 15 performs compression/decompression (compression/unpacking) processing in conformance to the JPEG standard which is the international standard for still images, and in more specific terms, it is constituted of a one-chip decoder that performs logical processing such as discrete cosine transfer, inverse DCT, Huffman encoding/decoding and the like. In addition, the compression/decompression unit 15 stores data into a buffer memory 16 and accesses data to the buffer memory 16, and also implements a refresh operation for the buffer memory 16 constituted of a DRAM.

The buffer memory 16, which is a memory for temporarily holding the image data corresponding to one frame before the image data are compressed at the compression/decompression unit 15, and is constituted of a DRAM as described above.

An SRAM 22 functions as a buffer memory where image data that have been compressed at the compression/decompression unit 15 are temporarily stored before they are ultimately stored in a flash memory 26 in the form of a JPEG file with header information added.

The flash memory 26 is a non-volatile memory where the image file in the form of a JPEG file with header information added is ultimately stored.

An external interface 27 is an interface for achieving data transfer and the like between an external processing apparatus such as a personal computer and the electronic camera main body.

A digital encoder 17 is constituted of a chip for modulating the digital data to an analog video signal.

A display 18, which may be constituted of an LCD or the like, outputs a video signal generated by the digital encoder 17 as display.

An electronic flash device 24 has a function of achieving external light modulation control by itself. Namely, at the electronic flash device 24, light emission, charge and the like are controlled by a CPU 21 that is to be detailed later, and the emitted light quantity control is achieved through external light modulation, which is realized by the electronic flash device alone.

An LCD 23 achieves liquid crystal display of the statuses in regard to various photographing modes, the number of remaining frames, erasure and battery detection.

The CPU 21, which may be constituted of, for instance, a microprocessor, achieves overall control of the individual components described above.

A timing generator 20 generates various pulses for driving the image-capturing element 10 and various timing pulses used at the individual components described above.

The image-capturing element 10 is controlled with drive timing pulses supplied by the DSP 14 explained earlier. A horizontal transfer pulse for achieving the horizontal electrical charge transfer at the image-capturing element 10 directly drives the image-capturing element 10 via the timing generator 20 from the DSP 14. A vertical transfer pulse for achieving the vertical electrical charge transfer is first input to the timing generator 20 and then the image-capturing element 10 is driven by a signal that is achieved through voltage conversion via a drive unit 19.

In this structure, an operating unit 25 includes a photographing mode selector switch for switching among various photographing modes and a command dial for setting various commands.

In other words, the color image photographing mode (color mode) and the black and white image photographing mode (black and white mode) described earlier are selected and specified through the photographing mode selector switch at the operating unit 25. When the color mode is specified, the CPU 21 indicates to the DSP 14 that the color mode has been set, and the DSP 14, in turn, generates a drive timing pulse for sequentially transferring the pixel groups in the horizontal direction in units of single stages in conformance to the normal electrical charge transfer control for the four pixels within each color pixel group 6 to drive the image-capturing element 10 and also performs signal processing that corresponds to a color image output on the output signal that has been input via the A/D converter 13.

Figure 27:
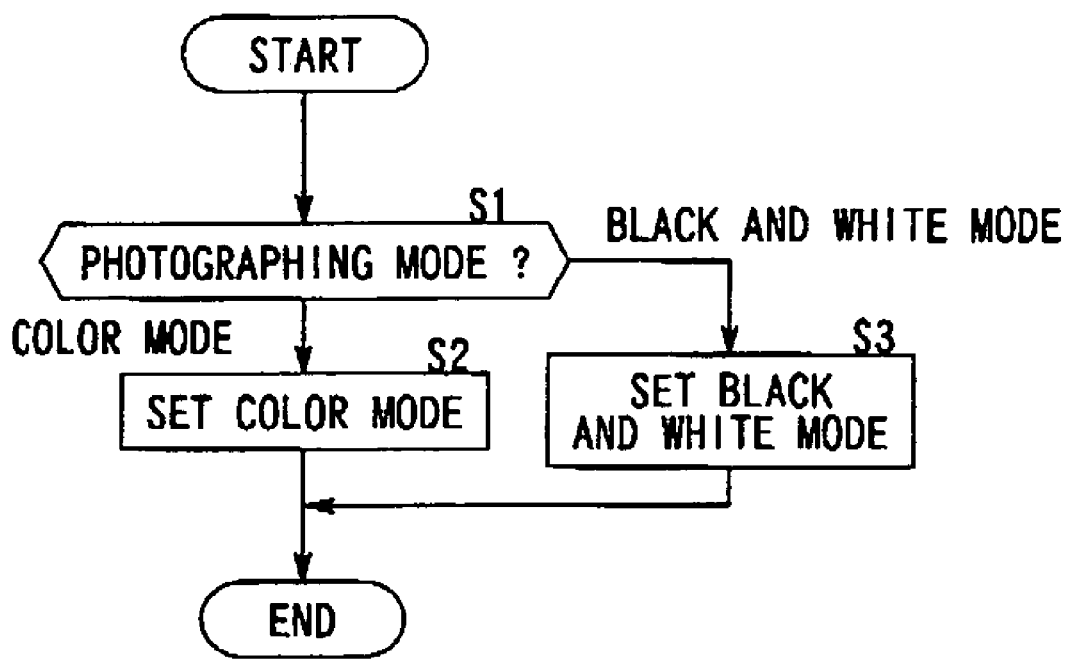
FIG. 27 is a flowchart of the switching control for the photographing mode.

FIG. 27 is a flowchart illustrating the photographing mode switching control. This control is executed by the CPU 21. In step S1, the CPU 21 makes a decision in regard to the status of the photographing mode selector switch at the operating unit 25. The operation proceeds to step S2 if the photographing mode selector switch is set to the color mode.

In step S2, the photographing mode is set to the color mode and the DSP 14 is notified of the setting. If, on the other hand, the photographing mode selector switch is set to the black and white mode, the operation proceeds to step S3. In step S3, the photographing mode is set to the black and white mode, and the DSP 14 is notified of the setting.

In addition, the CPU 21 engages in the control in which instructions corresponding to the color mode are issued to the other components. If, on the other hand, the black and white mode is specified, the CPU 21 notifies the DSP 14 of the black and white mode setting, and the DSP 14, in turn, generates a drive timing pulse for adding together the four pixels within each color pixel group 6 to drive the image-capturing element and performs signal processing corresponding to a black and white image output on the output signal that has been input via the A/D converter 13. In addition, the CPU 21 engages in the control in which instructions corresponding to the black and white mode are issued to the other components. However, in the black and white mode, only the brightness signal Y needs to be processed and, as a result, the load corresponding to the processing at the DSP 14 and the subsequent processing on the signal output by the DSP 14 is smaller compared to that in the color mode.

Furthermore, while the color mode and the black and white mode are manually switched via the operating unit 25 in this electronic camera, the present invention is not limited to this example, and automatic switching control whereby the CPU 21 achieves automatic switching based upon the light quantity detected by a light quantity detection unit (not shown) may be implemented, instead. For instance, if a sufficient light quantity cannot be obtained on account of the photographing environment being too dark, the photographing mode should be switched to the high sensitivity black and white mode, whereas when the photographing environment is bright enough, the photographing mode should be switched to the high resolution color mode.

It is to be noted that when the color temperature of the light source is different from the reference color temperature in a certain photographing environment, color temperature correction may be achieved by using a color correction filter. This hardly affects the processing load of the color correction achieved by the DSP 14 in the color mode.

FIG. 5 is a plan view of the electronic camera described above. An electronic camera main body 31 is provided with a photographing mode selector switch 32, a command dial 33, an LCD 34 and a release switch 35. The photographing mode selector switch 32, the command dial 33 and the release switch 35 are part of the operating unit 25 in FIG. 4, whereas the LCD 34 corresponds to the LCD 23 in FIG. 4. The photographing mode selector switch 32 is provided to switch between the color mode and the black and white mode, and the mode status selected through this switch 32 is indicated in the LCD 34. In addition, the command dial 33 is employed in an operation for setting the shutter speed, the aperture value and the like and the results of the setting operation performed through the command dial 33 are indicated in the LCD 34.

Second Embodiment

The following is an explanation of the second embodiment of the present invention given in reference to the drawings. The image capturing element in the second embodiment achieves an improvement in the dynamic range while maintaining a high degree of sensitivity by appropriately adding pixels.

Figure 6:
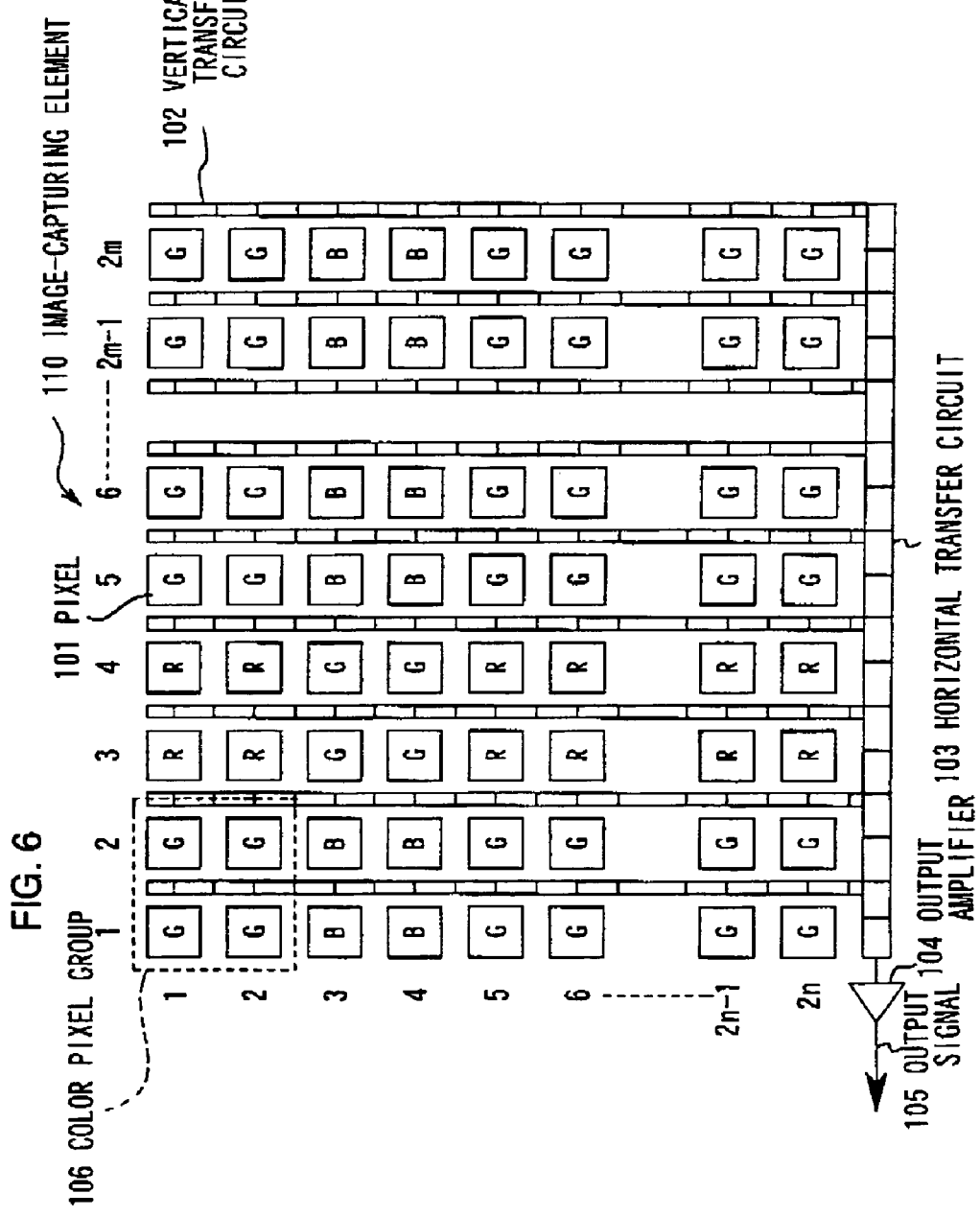
FIG. 6 illustrates the structure of the image-capturing element in a second embodiment of the present invention.

FIG. 6 illustrates the structure of the image-capturing element in the second embodiment. An image-capturing element 110 constitutes a color pixel matrix achieved by arraying a plurality of pixels 101, 2m of which are provided in the horizontal direction (the direction of rows) and 2n of which are provided in the vertical direction (the direction of columns). The color pixel matrix is constituted of m×n color pixel groups 106 in each of which all of the 2×2 pixels i.e., the four pixels adjacent to each other vertically and horizontally, are of a single color component.

When the color pixel matrix is regarded in units of the m×n individual color pixel groups 106, the color pixel matrix adopts an RGB Bayer array. For instance, the four pixels, i.e., M(1,1), M(1,2) M(2,1) and M(2,2) in the 2m×2n color pixel matrix M are arrayed as a pixel having a color filter with the color component G, the four pixels i.e. M(1,3) M(1,4) M(2,3) and M(2,4) are arrayed as a pixel having a color filter with the color component R, the four pixels i.e., M(3,1) M(3,2) M(4,1) and M(4,2) are arrayed as a pixel having a color filter with the color component B and the four pixels i.e. M(3,3) M(3,4) M(4,3) and M(4,4) are arrayed as a pixel having a color filter with the color component G.

The pixels 101 each provided with a photoelectric conversion element such as a photodiode each function as an R. G or B color component pixel, and the individual pixels 101 having this function are each provided with a color filter at the upper surface thereof that allows light having the R, G or B color component to be transmitted, as explained earlier. As a result, the pixel 101 at the color pixel matrix M(1,1) for instance, allows transmission of only the light with the G (green) color component, receives it and performs photoelectric conversion with it. It is to be noted that both m and n are natural numbers.

In other words, a pixel as referred to in this context represents a conceptual pixel that includes a photoelectric conversion element such as a photodiode, a storage portion where the electrical charge generated at the photoelectric conversion element is stored and the color filter described above.

Figure 7:
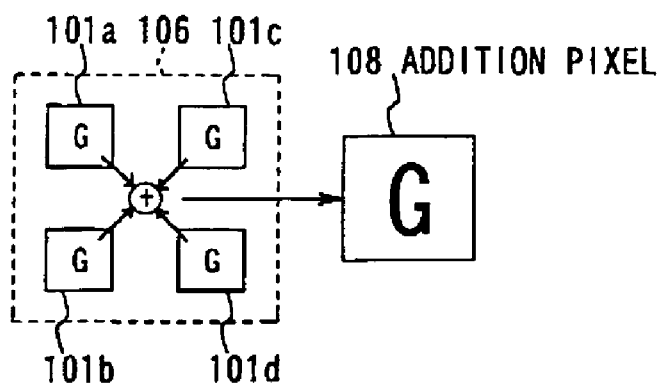
FIG. 7 illustrates the principle of obtaining a high sensitivity image through addition in a color pixel matrix.

In this structure, as illustrated in FIG. 7, the electrical charges stored at the four individual pixels within each color pixel group 106 are added together on the image-capturing element 110, and an output signal 105 adopting a mode whereby individual added electrical charges achieved through such addition are sequentially transferred adjacent to each other is output from the image-capturing element 110.

Figure 8:
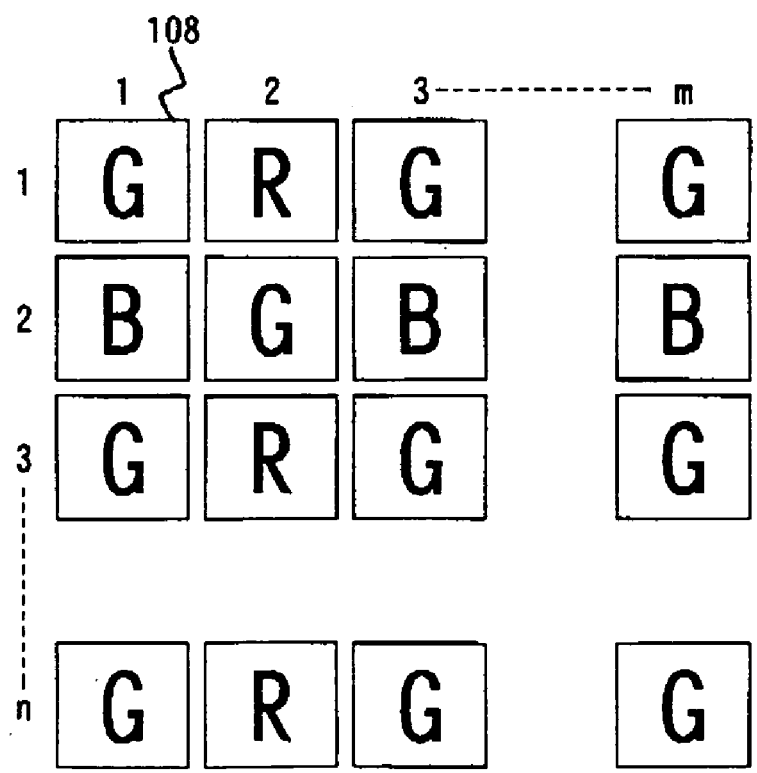
FIG. 8 illustrates a high sensitivity image obtained through addition in a color pixel matrix.

As a result, as illustrated in FIG. 8, a pixel array adopting an RGB Bayer array achieved in units of the individual color pixel groups 106 is realized.

The following addition modes may be adopted in the addition operation performed on the image-capturing element 110. In the first mode, two pixels 101*a* and 101*b* along a single longitudinal column within the color pixel group 106 are added together and two pixels 101*c* and 101*d* along a single longitudinal column within the color pixel group 106 are added together at vertical transfer circuits 102, and the added pixels are further added together at an output amplifier 104.

In the second mode, the two pixels 101*a* and 101*b* along the single longitudinal column and the two pixels 101*c* and 101*d* along another single longitudinal column within the color pixel group 106 are sequentially transferred to the vertical transfer circuits 102, the two pixels along each longitudinal column are added together at the horizontal transfer circuit 103 when they are transferred to the horizontal transfer circuit 103 and the added pixels are further added together at the output amplifier 104.

In the third mode, the electrical charges at the four individual pixels are output only to the vertical transfer circuit 102 present between the two longitudinal columns (between the pair of pixels 101a and 101b and the pair of pixels 101c and 101d) of the four pixels within the color pixel group 106, the two pixels 101a and 101c along the single horizontal row are added together at the vertical transfer circuit 102, the two pixels 101b and 101d along the single horizontal row are added together at the vertical transfer circuit 102, and the addition pixels along the single longitudinal column are then added together at the vertical transfer circuit 102.

In addition, in the fourth mode, the two pixels 101a and 101b along the single longitudinal column within the color pixel group 106 are added together and the two pixels 101c and 101d along the single longitudinal column within the color pixel group 106 are added together, at the vertical transfer circuit 102, then the added pixels are directly output as an output signal 105 as they are.

In the fifth mode, the two pixels 101a and 101b along the single longitudinal column and the two pixels 101c and 101d along the single longitudinal column within the color pixel group 106 are sequentially transferred onto the vertical transfer circuit 102, and the two pixels along each longitudinal column are added together at the horizontal transfer circuit 103 when they are transferred to the horizontal transfer circuit 103, then the added pixels are directly output as an output signal as they are.

In the sixth mode, the four pixels within the color pixel group 106 are sequentially transferred vertically via the vertical transfer circuits 102, then sequentially transferred horizontally via the horizontal transfer circuit 103 and the two pixels 101a and 101c along the single lateral row within the color pixel group 106 are added together and the two pixels 101b and 101d along the single lateral row within the color pixels group 106 are added together at the output amplifier 104, and then the added pixels are directly output as an output signal 105 as they are.

These addition modes that may be adopted on the image-capturing element 110 can be achieved easily by controlling the drive of the image-capturing element 110 during the electrical charge transfer.

With the four pixels in each color pixel group 106 added together to be output as the output signal 105 on the image-capturing element 110, the electrical charge quantities corresponding to the R, G and B color components within the individual color pixel groups 106 are quadrupled relative to the electrical charges of the single pixels, whereas with the two pixels added together, the electrical charge quantities are doubled. In both cases the sensitivity is improved and, at the same time, the dynamic range for the photoelectric conversion can be improved.

It is to be noted that while 2×2=4 pixels are provided in each color pixel group 106 in the color pixel matrix in the image-capturing element 110 described above, the present invention is not limited to this example, and it may adopt a structure assuming any array mode with 1×2=2 pixels, 3×3=9 pixels, 3×2-6 pixels or the like.

In addition, while the image-capturing element 110 above is explained on the premise that it is constituted of a CCD solid image-capturing element, the present invention is not limited to this example and it is obvious that the present invention may be adopted in an amplifier type solid image-capturing element which takes out electrical charges stored at the individual pixels 101 through switching processing performed at the pixels 101.

Since the structure of an electronic camera functioning as an image-capturing device employing the image-capturing element 110 illustrated in FIG. 6 is similar to that of the electronic camera illustrated in FIGS. 4 and 5 that has been explained in the first embodiment, the following explanation is given in reference to FIGS. 4 and 5. The explanation of the individual components is omitted.

The operating unit 25 includes a photographing mode selector switch for switching among various photographing modes and a command dial for setting various commands.

Through the photographing mode selector switch at the operating unit 25, a high resolution mode for outputting a color image in units of the individual pixels 101 in the color pixel matrix, a high sensitivity mode for outputting a color image in units of the color pixel groups 106, or an auto mode for automatically switching between the high resolution mode and the high sensitivity mode depending upon the photographing environment including the brightness and the like is selected and specified.

When the high resolution mode is specified, the CPU 21 notifies the DSP 14 that the high resolution mode has been set. The DSP 14, in turn, generates a drive timing pulse whereby the four pixels within each color pixel group 106 are transferred in conformance to the regular electrical charge transfer control and the pixel groups in the horizontal direction are sequentially transferred in units of individual stages, to drive the image-capturing element 110. In addition, the signal processing corresponding to the color image output is implemented on the output signal input via the A/D converter 13. The CPU 21 also engages in the control in which instructions corresponding to the high resolution mode are issued to the other components.

When the high sensitivity mode is specified, the CPU 21 notifies the DSP 14 that the sensitivity mode has been set. The DSP 14, in turn, generates a drive timing pulse thereby the four pixels within each color pixel group 106 are added together to drive the image-capturing element, and also performs the image processing on the output signal input via the A/D converter 13. In addition, the CPU 21 engages in the control in which instructions corresponding to the high sensitivity mode are issued to the other components.

When the auto mode is specified, the CPU 21 notifies the DSP 14 that the auto mode has been set. The DSP 14 generates a drive timing pulse for the image-capturing element 110 using, for instance, the high resolution mode as the default mode, monitors the brightness component based upon the output signal from the image-capturing element 110, makes a decision as to whether or not the brightness component is equal to or less than a specific value and switches to the high sensitivity mode if the results of the decision-making indicate that the brightness component is equal to or less than the specific value, whereas it sustains the high resolution mode if the brightness component is not equal to or less than the specific value.

Figure 28:
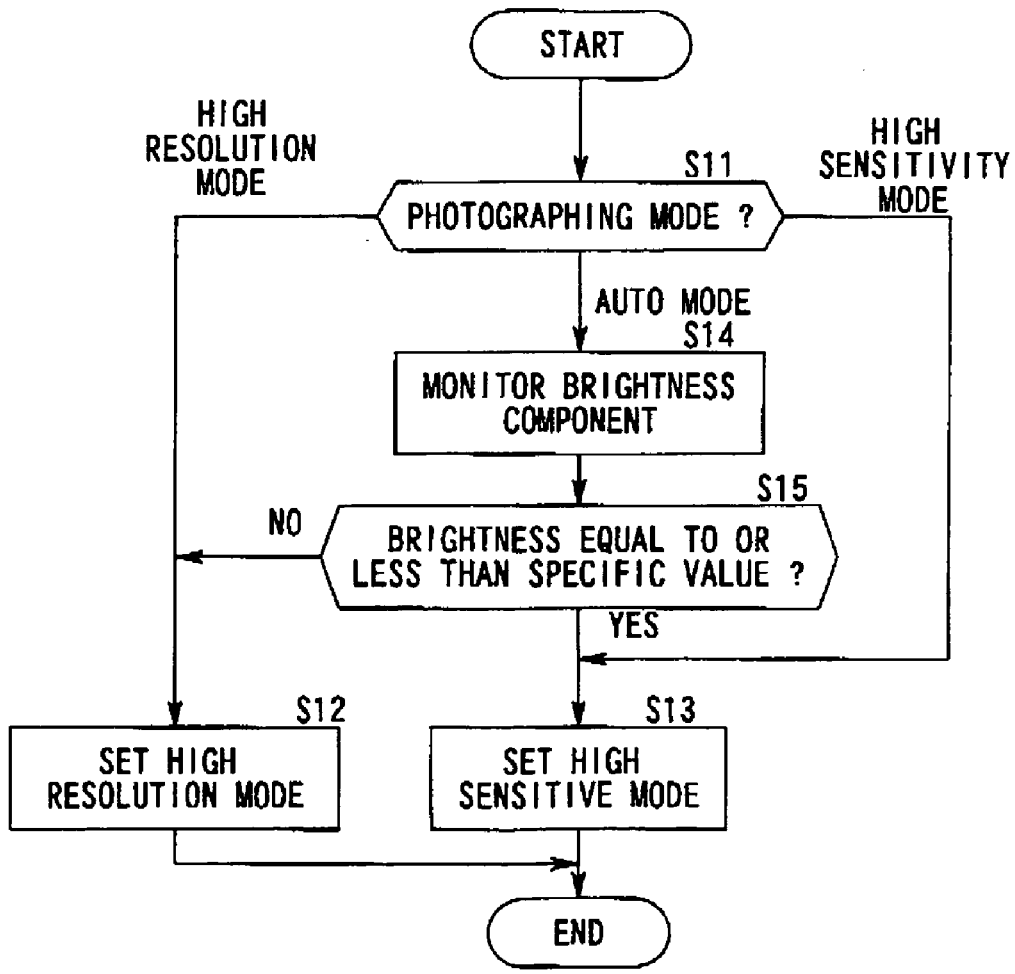
FIG. 28 is a flowchart of the switching control for the photographing mode.

FIG. 28 is a flowchart illustrating the photographing mode switching control described above. This control is executed by the CPU 21. In step S11, the CPU 21 makes a decision in regard to the status of the photographing mode selector switch at the operating unit 25. The operation proceeds to step S12 if the photographing mode selector switch is set to the high resolution mode. In step S12, the photographing mode is set to the high resolution and the DSP 14 is notified of the setting. If the photographing mode selector switch is set to the high sensitivity mode, on the other hand, the operation proceeds to step S13. In step S13, the photographing mode is set to the high sensitivity mode and the DSP 14 is notified of the setting. If the photographing mode selector switch is set to the auto mode, the operation proceeds to step S14 in which the photographing mode is first set to the high resolution mode and the DSP 14 is notified of the setting and then the brightness signal is monitored from the image-capturing element 11. In step S15, a decision is made as to whether or not the monitored brightness level is equal to or less than the specific value. If it is equal to or less than the specific value, the operation proceeds to step S13 in which the photographing mode is switched to the high sensitivity mode. If it is more than the specific value, on the other hand, the operation proceeds to step S12 in which the high resolution mode is sustained.

It is to be noted that since, if the output signal is achieved by adding together only two pixels among the four pixels in each color pixel group 106, the high sensitivity and the high resolution, the degrees of which are half way between the high sensitivity achieved by adding together the four pixels and the high resolution achieved through the processing of the individual pixels, are realized, this may be added as an intermediate mode. Furthermore, this intermediate mode may be added as an object for switching in the auto mode.

Now, FIG. 5 illustrating the first embodiment presents a plan view of the electronic camera. At the electronic camera main body 31, the photographing mode selector switch 32, the command dial 33, the LCD 34 and the release switch 35 are provided. The photographing mode selector switch 32, the command dial 33 and the release switch 35 are part of the operating unit 25 illustrated in FIG. 4, with the LCD 34 corresponding to the LCD 23 in FIG. 4. The photographing mode selector switch 32 is provided to select a mode among the three modes, i.e., the high resolution mode, the high sensitivity mode and the auto mode, and the status of the mode setting thus selected is indicated on the LCD 34. In addition, the command dial 33 is employed in an operation for setting the shutter speed, the aperture value and the like, and the results of the setting operation and the like are indicated on the LCD 34.

Thus, in the electronic camera, a color image achieving a high resolution can be achieved and, at the same time, a high sensitivity color image having a wide dynamic range at a high degree of sensitivity can be achieved using a single image-capturing element 110. Furthermore, since the switching can be achieved either manually and automatically, flexible color image-capturing is realized.

Third Embodiment

The following is an explanation of the third embodiment given in reference to the drawings. In the image-capturing element in the third embodiment, an image-capture signal with a wide dynamic range is achieved through appropriate synthesis (or composition), addition and the like of pixels.

Figure 9:
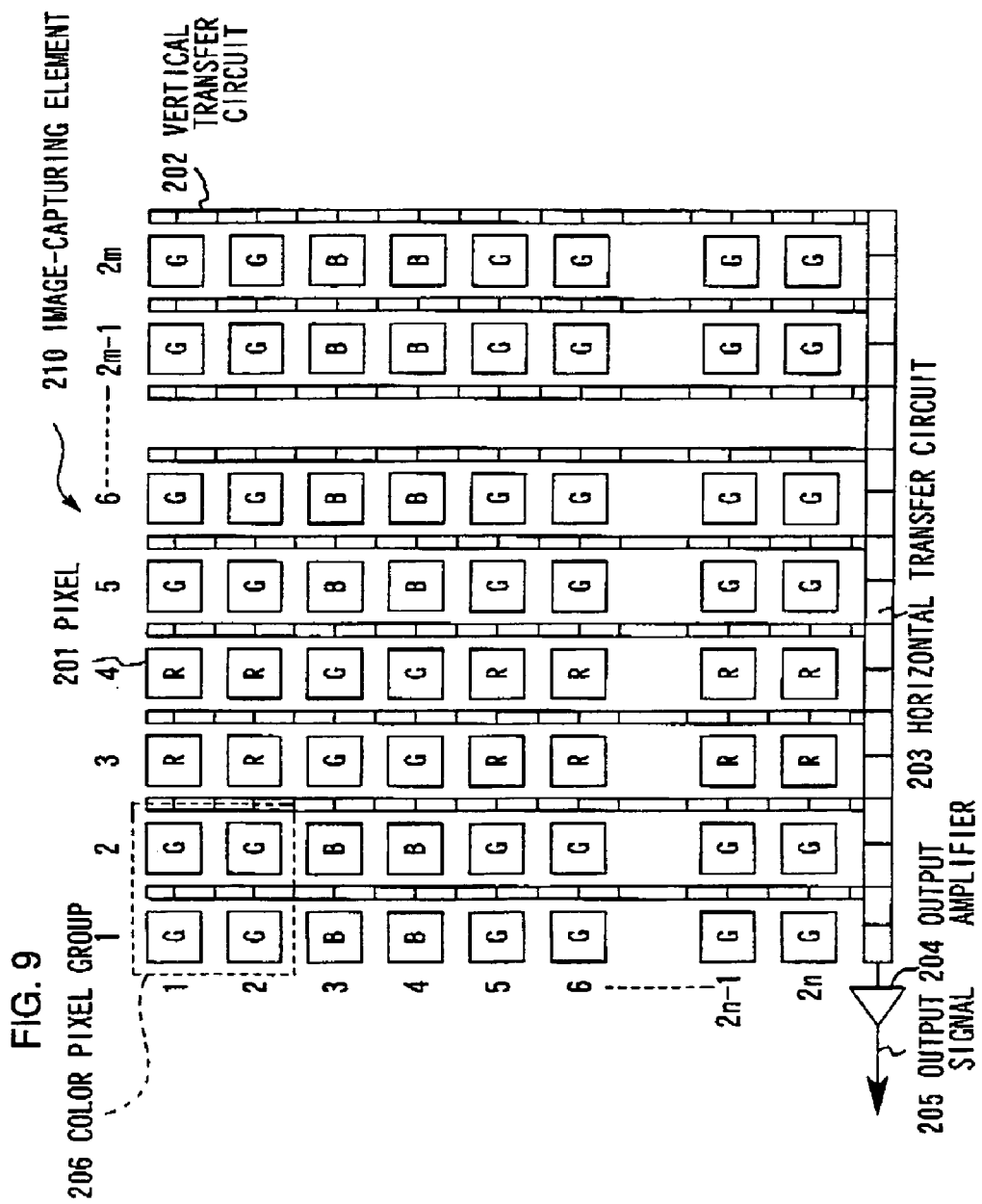
FIG. 9 illustrates the structure of the image-capturing element in a third embodiment of the present invention.

FIG. 9 illustrates the structure of the image-capturing element in the third embodiment. An image-capturing element 210 constitutes a color pixel matrix achieved by arraying a plurality of pixels 201, 2m of which are provided in the horizontal direction (the direction of rows) and 2n of which are provided in the vertical direction (the direction of columns). The color pixel matrix is constituted of m×n color pixel groups 206 in each of which all of the 2×2 pixels i.e., the four pixels adjacent to each other vertically and horizontally are of a single color component.

When the color pixel matrix is regarded in units of the m×n individual color pixel groups 206, the color pixel matrix adopts an RGB Bayer array. For instance, the four pixels. i.e., M(1,1), M(1,2), M(2,1) and M(2,2) in the 2 m×2n color pixel matrix n are arrayed as a pixel having a color filter with the color component G, the four pixels i.e., M(1,3). M(1,4), M(2,3) and M(2,4) are arrayed as a pixel having a color filter with the color component R, the four pixels i.e. M(3,1), M(3,2), M(4,1) and M(4,2) are arrayed as a pixel having a color filter with the color component B and four pixels i.e., M(3,3), M(3,4), M(4,3) and M(4,4) are arrayed as a pixel having a color filter with the color component G.

The pixels 201 each provided with a photoelectric conversion element such as a photodiode each function as an R, G or B color component pixel, and the individual pixels 201 having this function are each provided with a color filter at the upper surface thereof that allows light having the R, G or B color component to be transmitted. As a result, the pixel 201 at the color pixel matrix M(1,1), for instance, allows transmission of only the light with the G (green) color component, receives it and performs photoelectric conversion with it. It is to be noted that both m and n are natural numbers.

A pixel as referred to in this context represents a conceptual pixel that includes a photoelectric conversion element such as a photodiode, a storage portion where the electrical charge generated at the photoelectric conversion element is stored and the color filter described above.

Figure 10:
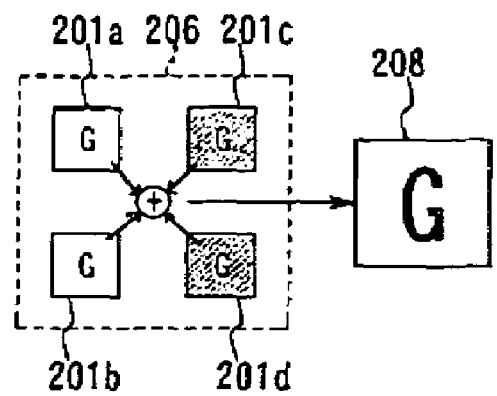
FIG. 10 illustrates the principle of obtaining a signal with a high sensitivity and a wide dynamic range achieved through signal synthesis in a color pixel matrix.

In addition, as illustrated in FIG. 10, while the color filters at the four pixels within each color pixel group 206 achieve the same transmissivity (or transmittance) for the pixels 201a and 201b provided adjacent to each other in the vertical direction and the same transmissivity for the pixels 201c and 201d provided adjacent to each other in the vertical direction, the transmissivities at the pixels 201a and 201c adjacent to each other in the horizontal direction and at the pixels 201b and 201d adjacent to each other in the horizontal direction are different from each other. However, the spectral characteristics of the pixels adjacent to each other in the horizontal direction are the same. Thus, in each color pixel group 206, color filters with the same color component but having characteristics that achieve varying degrees of sensitivity are mounted at the pixels adjacent to each other in the horizontal direction, whereas color filters with the same color component and having characteristics that achieve the same degree of sensitivity are mounted at the pixels adjacent to each other in the vertical direction.

In FIG. 10, color filters with the color component C and a high degree of sensitivity are mounted at the pixels 201a and 201b whereas color filters with the color component G and a low degree of sensitivity are mounted at the pixels 201c and 201d. By adding together the electrical charges at the pixels adjacent to each other in the vertical direction having the same degree of sensitivity, the electrical charge quantity can be increased to double the signal quantity. The virtual pixel achieved by reading out the electrical charge quantity achieved by adding together two pixels may be regarded as a single pixel located at the center of the two pixels. In addition, by separately reading out the electrical charge at a pixel with a high degree of sensitivity and the electrical charge at a pixel with a low degree of sensitivity at the same time and synthesizing them at a signal processing circuit, the dynamic range can be expanded, and this point will be detailed later. The term of synthesizing means composing or combining.

The electrical charges at the two pixels provided adjacent to each other in each column having the same color component among the electrical charges stored at the four individual pixels within the color pixel group 206 are added together on, for instance, the image capturing element 210, and the image-capturing element 210 outputs an output signal 205 adopting a mode in which the added electrical charges achieved through such addition are sequentially transferred adjacent to each other.

Figure 11:
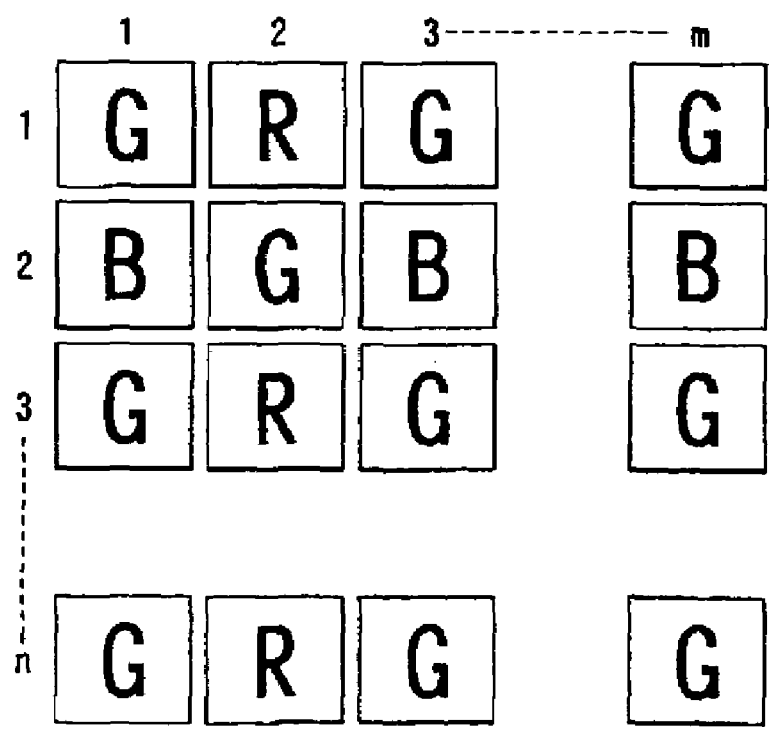
FIG. 11 illustrates a high sensitivity image with a wide dynamic range achieved through signal synthesis in a color pixel matrix.

By synthesizing, at an external signal processing circuit, an output signal (201a+201b) and an output signal (201c+201d) having the same color component and adjacent to each other in the horizontal direction among the output signals achieved by adding together two pixels adjacent to each other in the vertical direction, a synthesized signal of the pixels with the color component representing the color pixel group 206, as illustrated in FIG. 10, is obtained. A virtual pixel 208 achieved by synthesizing the signals corresponding to the four pixels in each color pixel group 206 may be regarded as a single pixel located at the center of the four pixels. By obtaining output signals sequentially in this manner for the individual color pixel groups 206, an m×n color image having a pixel array adopting the RGB Bayer array achieved in units of the individual color pixel groups 206 is achieved, as illustrated in FIG. 11.

The following modes may be adopted for a read out of pixel electrical charges or signals.

In the first mode, the individual pixels are read out separately.

In the second mode, the electrical charges at the pixels 201a and 201b adjacent to each other along the single longitudinal column and the electrical charges at the pixels 201c and 201d along the single longitudinal column are separately added together within the color pixel group 206 when they are being individually read out to the vertical transfer circuit 202, and the added electrical charge quantities achieved through such addition are read out from the vertical transfer circuits 202 sequentially via the horizontal transfer circuit 203 and the output amplifier 204.

In the third mode, the pixels 201a and 201b adjacent to each other along the single longitudinal column and the pixels 201c and 201d adjacent to each other along the single longitudinal column within the color pixel group 206 are sequentially transferred onto the vertical transfer circuits 202 and then the electrical charges are added together at the vertical transfer circuit 202. The added electrical charges each corresponding to the two pixels adjacent to each other in the vertical direction are then sequentially transferred to the horizontal transfer circuit 203 and are output via the output amplifier 204.

Such addition modes as described above can be achieved easily by controlling the electrical charge transfer operation by the drive circuit at the image-capturing element.

It is to be noted that the electrical charges at the four pixels having the same color component within each color pixel group 206 achieving the pixel configuration illustrated in FIG. 10 may be added together within the image-capturing element 210 so that a signal corresponding to the added electrical charge achieved through such addition can be obtained as an output signal 205. In this case, the ratio of the signal electrical charge quantity relative to the noise charge quantity can be increased compared to the ratio achieved at individual pixels so that an improvement is achieved both in the sensitivity and the dynamic range.

In order to add together the electrical charges at the four pixels within the image-capturing element, the electrical charges at each pair of two pixels adjacent to each other in the vertical direction among the four pixels may be added together when they are read out to the vertical transfer circuit and the resulting added electrical charges adjacent to each other in the horizontal direction may be then added together at the horizontal transfer circuit for output. Alternatively, the electrical charges at each pair of two pixels adjacent to each other in the vertical direction may be added together at the vertical transfer circuit after they are read out to the vertical transfer circuit, with the added electrical charges adjacent to each other in the horizontal direction further added together within the horizontal transfer circuit.

Next, in reference to FIGS. 12A and 12B, the principle of the expansion of the dynamic range which is achieved through synthesis of pixels adjacent to each other in the horizontal direction having color filters with different transmissivities, i.e. through synthesis of the pixels 201a and 201b and the pixels 201c and 201d, is explained.

FIG. 12A illustrates the relationship between the light quantity at a pixel and its photoelectric conversion electrical charge quantity before synthesis, and FIG. 12B illustrates the relationship after synthesis. In FIG. 12A the line L1 corresponds to the sum achieved by adding together the pixels 201a and 201b and represents the photoelectric conversion relationship of pixels achieving a high degree of sensitivity through the use of color filters with a high degree of transmissivity. When the light quantity exceeds a point P1, the transfer electrical charge quantity is saturated. The line L2, which corresponds to the sum achieved by adding together the electrical charges at the pixels 201c and 201d illustrates the photoelectric conversion relationship of pixels having a low degree of sensitivity due to the use of color filters with a low degree of transmissivity. While the transfer electrical charge quantity does not become saturated over the light quantity range illustrated in FIG. 12, the transfer electrical charge quantity is low.

By synthesizing the signals corresponding to the electrical charges at the pixels 201a and 201b with a high degree of sensitivity and at the pixels 201c and 201d with a low degree of sensitivity using an external signal processing circuit, the output that is achieved by linking the linear portions of the line L1 and the line L2, i.e., the photoelectric conversion relationship represented by the line L, is realized, as shown in FIG. 12B. The external signal processing circuit can synthesize the signals by executing a certain software program. Within the range of the light quantity illustrated in FIG. 12B, the incident light quantity over a wide range can be converted to a conversion electrical charge quantity without reaching saturation to expand the dynamic range. Furthermore, the sensitivity, too, can be improved by adding together the electrical charges at the pixels adjacent to each other in the vertical direction in this case. It is desirable that the pitches (inclinations) of the converted electrical charge quantities relative to the light quantity at the pixels adjacent to each other in the horizontal direction achieve a difference of 100% or more.

Thus, with the signals corresponding to the four pixels within each color pixel group 206 synthesized as described above, the dynamic range is expanded through the synthesis of the signals for the pixels adjacent to each other in the horizontal direction whereas the electrical charge quantity can be doubled or more through the addition of the electrical charges at the pixels adjacent to each other in the vertical direction to greatly improve the sensitivity.

Figure 13:
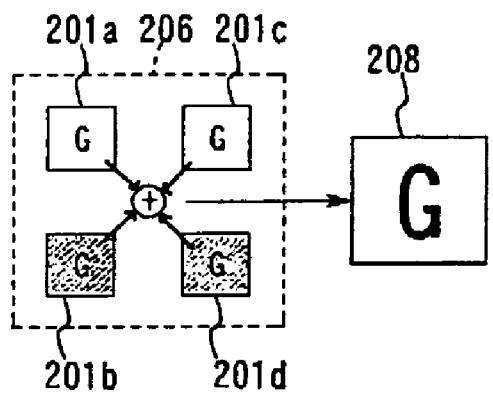
FIG. 13 illustrates an example of a pixel array mode that may be adopted within a color pixel group.

In addition, as illustrated in FIG. 13, the four pixels within the color pixel group 206 may be arranged in such a manner that the pixels adjacent to each other in the horizontal direction have the same transmissivity while the transmissivities at the pixels adjacent to each other in the vertical direction are different from each other. Furthermore, while the pixels having the high transmissivity are provided on the upper side with the pixels having the low transmissivity provided on the lower side in FIG. 3, the reverse array may be adopted Next, an explanation is given on a structure with the four pixels within the color pixel group 206 all having different transmissivities.

Figure 14:
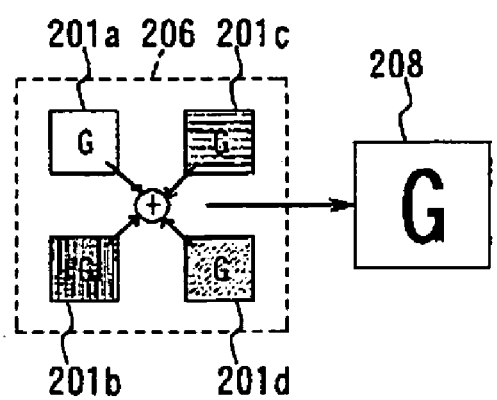
FIG. 14 illustrates an example of a pixel array mode that may be adopted when the transmissivities of all the pixels within the color pixel group are varied.
Figure 15A:
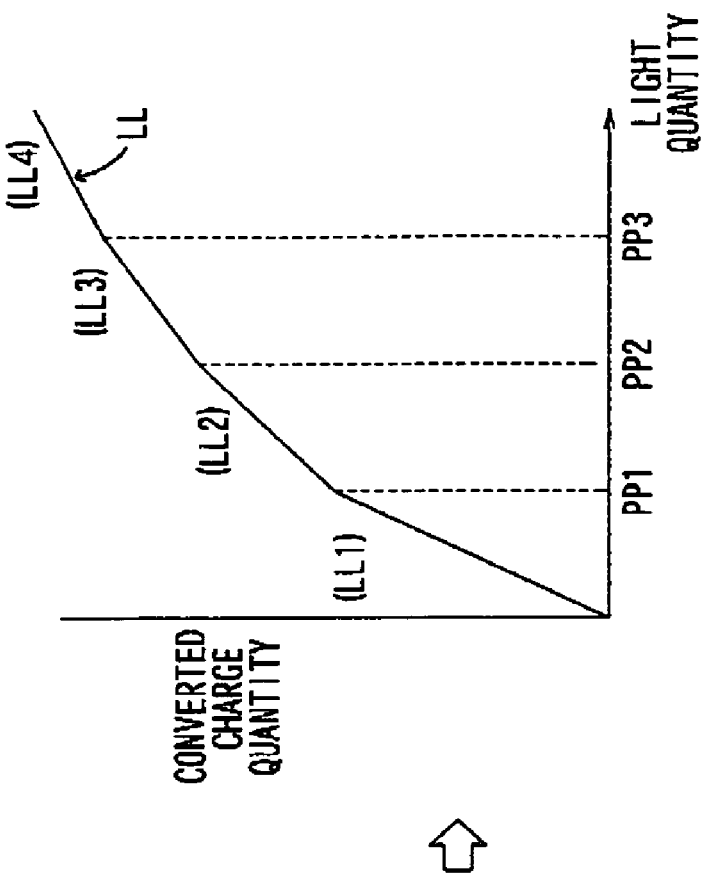
FIGS. 15A and 15B illustrate the photoelectric conversion characteristics with a wide dynamic range; achieved through signal synthesis when the transmissivities of all the pixels within the color pixel group are varied.
Figure 15B:
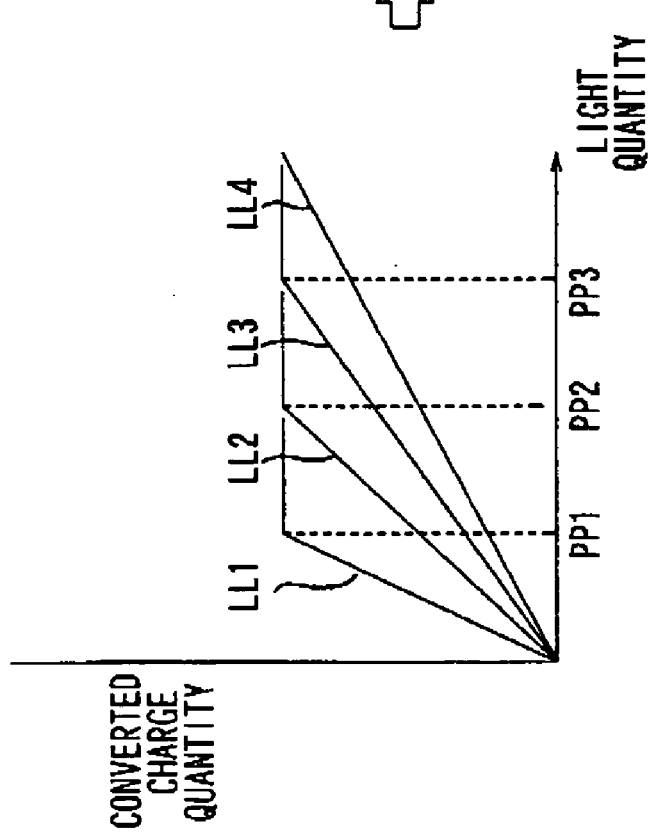

In FIG. 14, the transmissivities of the individual pixels 201a through 201d are set to become lower in the order of pixel 201a→pixel 201b→pixel 201c→pixel 201d. As a result, by reading out the signals corresponding to the four pixels 201a–201d independently of each other and linking them together at a signal processing circuit, an extremely wide dynamic range, as illustrated in FIG. 15B, is achieved. In FIG. 15A, the pixel 201a having the highest sensitivity achieves the photoelectric conversion relationship represented by the line LL1 that reaches saturation when the light quantity is equal to or more than the point PP1, the pixel 201b with the next highest sensitivity achieves the photoelectric conversion relationship represented by the line LL2 that reaches saturation when the light quantity is equal to or more than the point PP2, the pixel 201c with the next highest sensitivity achieves the photoelectric conversion relationship represented by the line LL3 that reaches saturation when the light quantity is equal to or more than the point PP3 and the pixel 201c with the lowest sensitivity achieves the photoelectric conversion relationship represented by the line LL4 that does not reach saturation over the range of the light quantity illustrated in FIG. 15B. Consequently, by synthesizing the signals corresponding to the individual pixels 201a through 201d to link these polygonal lines, the photoelectric conversion characteristics with an extremely wide dynamic range, as indicated by the line LL in FIG. 15B, are achieved.

It is to be noted that when the color pixel groups as illustrated in FIGS. 13 and 14 are provided, the electrical charges at the four pixels within each color pixel group can be added together within the image-capturing element to be read out.

Figure 17:
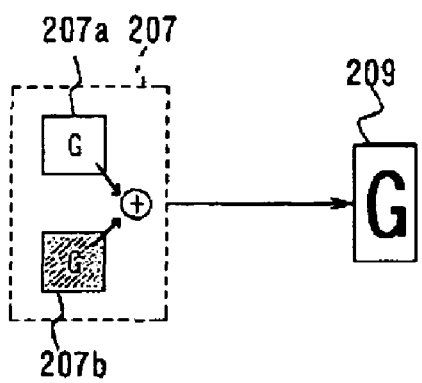
FIG. 17 illustrates an example of a pixel array mode in a color pixel group in the variation illustrated in FIG. 16.
Figure 18:
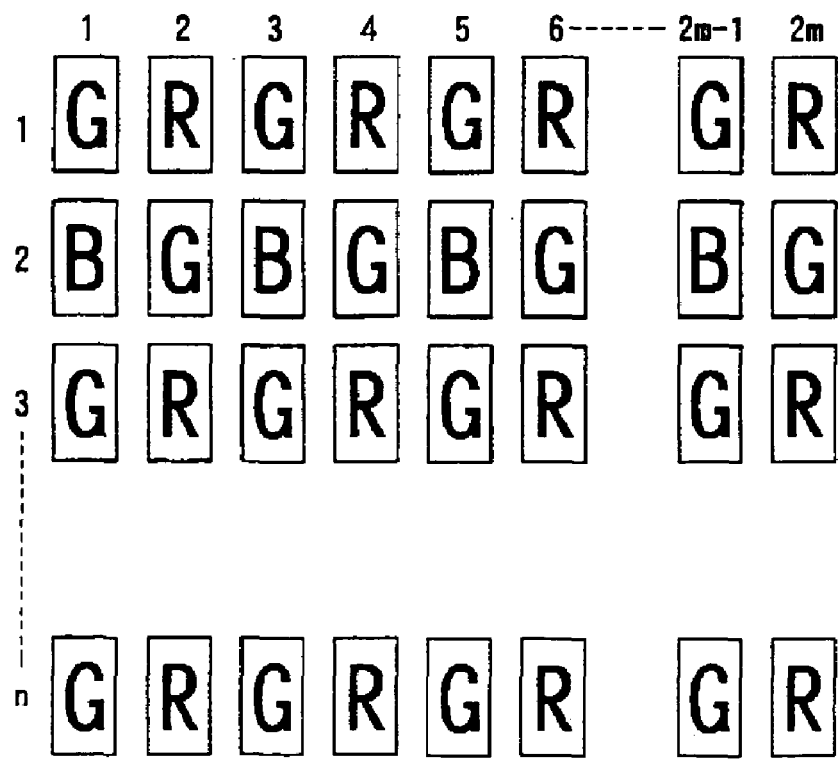
FIG. 18 illustrates the matrix of addition pixels with a wide dynamic range achieved through signal synthesis in a color pixel matrix

While the image-capturing element 201 described above is provided with color pixel groups each having 2×2, i.e., 4 pixels, an image-capturing element 210A with color pixel groups each having 1×2, i.e., 2 pixels, is now explained. Color pixel groups 207 each having 1×2 pixels illustrated in FIG. 16 are each constituted by providing together pixels having a single color component as in the case of the color pixel groups 206 each having 2×2 pixels illustrated in FIG. 9. These color pixel groups 207 achieve an RGB Bayer array in regard to the entire color pixel matrix. In addition, pixels 207a and 207b adjacent to each other in the vertical direction within each color pixel group 207 are provided with color filters with different transmissivities, as illustrated in FIG. 17. While a color filter achieving a high degree of transmissivity is mounted at the pixel 207a, a color filter with a low degree of transmissivity is mounted at the pixel 207b. Thus, a virtual pixel 209 achieved by synthesizing the signals from the pixels 207a and 207b at a signal processing circuit achieves a wide dynamic range. In addition, while a great improvement in the sensitivity cannot be achieved since two of the pixels in each group are not added together, as is the case in the image-capturing element 210 illustrated in FIG. 9, in which every two pixels are added together for an improvement in sensitivity, the resolution is improved. Namely, the array of the virtual pixels 209 constitutes a 2m×n color matrix, as illustrated in FIG. 18.

It is to be noted that while the color pixel groups 206 in the color image matrix within either the image-capturing element 210 or 210A each have 2×2=4 pixels or 1×2=2 pixels, the present invention is not limited to these examples and it may adopt a structure with color pixel groups having any number of pixels, including 1×2=2 pixels, 3×3=9 pixels and 3×2=6 pixels in an arbitrary array mode. However, it is necessary to provide color filters with different transmissivities within each color pixel group to achieve a wider dynamic range.

In addition, while the image-capturing element 210 is explained above on the premise that it is constituted of a CCD solid image-capturing element, the present invention is not limited to this example and it is obvious that the present invention may be adopted in an amplifier type solid image-capturing element which takes out the electrical charges stored at the individual pixels 201 through switching processing performed on the individual pixels 201

Since the structure of an electronic camera constituting an image-capturing device employing the image-capturing element 210 illustrated in FIG. 9 or the image-capturing element 210A illustrated in FIG. 16 is similar to that of the electronic camera illustrated in FIGS. 4 and 5 that has been explained in reference to the first embodiment, the following explanation is given in reference to FIGS. 4 and 5. The explanation of the individual components is omitted.

The operating unit 25 includes a photographing mode selector switch for switching among various photographing modes and a command dial for setting various commands.

Through the photographing mode selector switch at the operating unit 25, a high dynamic range mode for setting a wide dynamic range, a normal mode for transferring and outputting the individual pixels separately from the image-capturing element 210 and a high sensitivity mode are selected and specified.

When the normal mode is specified, the CPU 21 notifies the DSP 14 that the normal mode has been set. The DSP 14, in turn, generates a drive timing pulse whereby the pixel groups in the horizontal direction are sequentially transferred in units of individual stages in conformance to the regular electrical charge transfer control implemented on the four pixels within each color pixel group 206 to drive the image-capturing element 210. In addition, the signal processing that supports color image output is implemented on the output signal input via the A/D converter 13. The CPU 21 also engages in the control in which instructions corresponding to the normal mode to the other components.

When the high dynamic range mode specified, the CPU 21 notifies the DSP 14 that the high dynamic range mode has been set. The DSP 14 generates a drive timing pulse for adding together every two pixels having the same degree of sensitivity within each color pixel group 206 and for separately reading out signals from the pixels with different degrees of sensitivity to drive the image-capturing element. It also performs synthesizing processing on the output signals of the pixels having different degrees of sensitivity input via the A/D) converter 13. In addition, the CPU 21 engages in the control in which instructions corresponding to the high dynamic range mode are issued to the other components. Alternatively, if the pixels are arranged as illustrated in FIG. 14, no addition is performed within the image-capturing element and the individual pixels are independently read out to synthesize the signals from the individual pixels.

In addition, when the high sensitivity mode is specified, the DSP 14 generates a drive timing pulse for adding together the electrical charges at the four pixels within each color pixel group, in the image-capturing element, to drive the image-capturing element.

Figure 29:
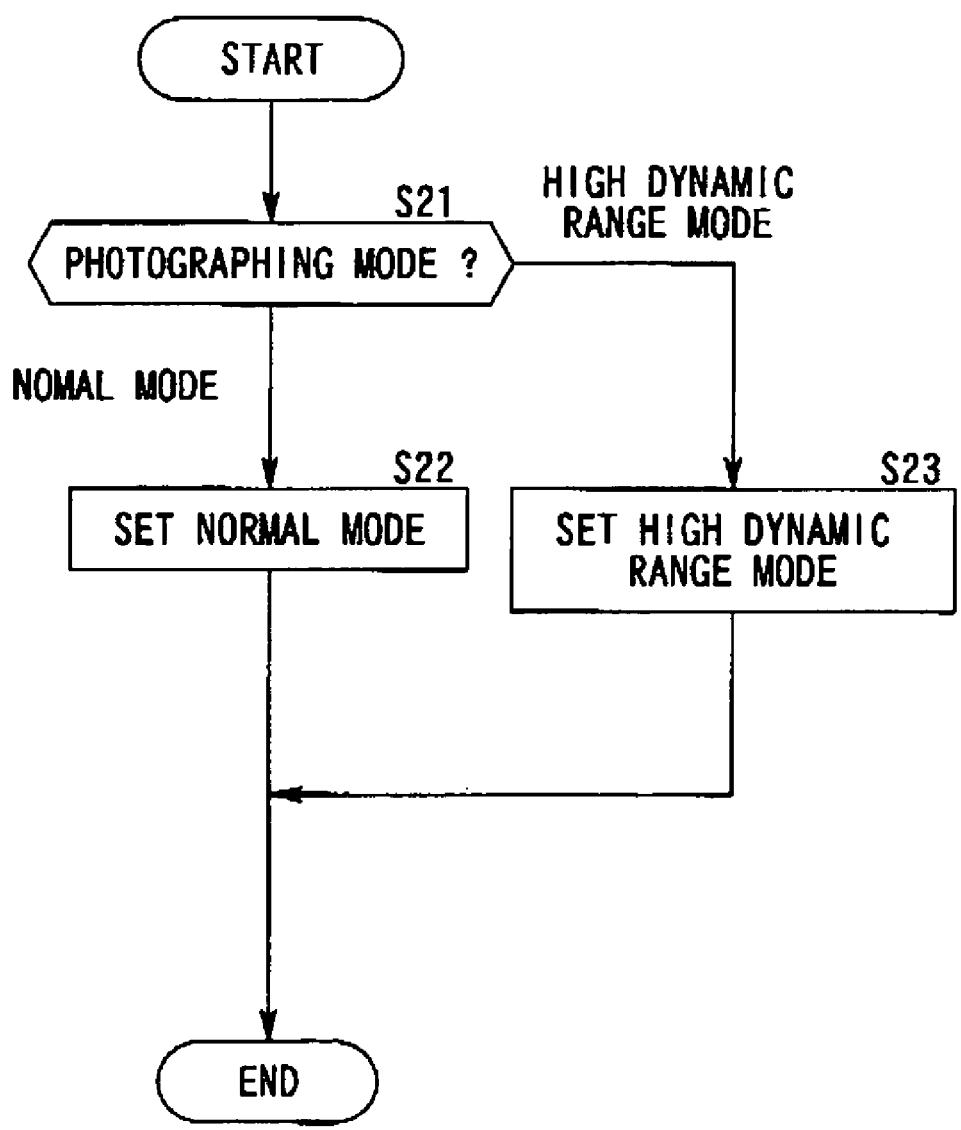
FIG. 29 is a flowchart of the switching control for the photographing mode.

FIG. 29 is a flowchart illustrating the photographing mode switching control described above. This control is executed by the CPU 21. In step S21, the CPU 21 makes a decision in regard to the status of the photographing mode selector switch at the operating unit 25. The operation proceeds to step S22 if the photographing mode selector switch is set to the normal mode. In step S22, the photographing mode is set to the normal mode and the DSP 14 is notified of the setting. If the photographing mode selector switch is set to the high dynamic range mode, on the other hand, the operation proceeds to step S23. In step S23, the photographing mode is set to the high dynamic range mode and the DSP 14 is notified of the setting. The DSP 14 receives signals from the pixels with different degrees of sensitivity via the A/D converter 13 and the like, and then performs the synthesizing processing with a certain program.

It is to be noted that although the third embodiment shows an example that the DSP 14 performs the synthesizing processing as described above, the external signal processing circuit to perform the synthesizing processing is not limited to the DSP 14. For example, the CPU 21 may receive signals from the pixels with different degrees of sensitivity via the A/D converter 13 and the like, and may perform the synthesizing processing with a certain program. In other words, any circuit that can perform the synthesizing processing can be adopted.

FIG. 5 is a plan view of the electronic camera. At the electronic camera main body 31, the photographing mode selector switch 32, the command dial 33, the LCD 34 and the release switch 35 are provided. The photographing mode selector switch 32, the command dial 33 and the release switch 35 are part of the operating unit 25 illustrated in FIG. 11, with the LCD 34 corresponding to the LCD 23 in FIG. 11. The photographing mode selector switch 32 is provided to select a mode among the individual modes and the mode setting thus selected is indicated on the LCD 34. In addition, the command dial 33 is employed in an operation for setting the shutter speed, the aperture value and the like, and the results of the setting operation and the like are indicated on the LCD 34.

Thus, in the electronic camera illustrated in FIG. 11, a color image is achieved both in the normal mode and the high sensitivity mode and in addition, a color image with a wide dynamic range is achieved with the same image-capturing element 210.

In other words, in the electronic camera in this embodiment, in which a plurality of color filters of the same color with different degrees of transmissivity are mounted, the dynamic range can be greatly expanded by independently reading out the signals from the pixels mounted with color filters having different degrees of transmissivity and connecting them together through signal processing to achieve a color image with an extremely wide dynamic range. In addition, by adding together the electrical charges at a plurality of pixels having the same color within the image-capturing element, the signal electrical charge quantity can be increased relative to the noise electrical charge quantity to increase both the sensitivity and the dynamic range. Furthermore, by combining the addition of the electrical charges performed within the image-capturing element and the synthesis through the signal processing, image-capturing over an extremely wide dynamic range can be achieved at a high degree of sensitivity.

It is to be noted that in the third embodiment the synthesizing processing is performed in the signal processing circuit outside of the image-capturing element, since the conversion electrical charge quantity is saturated beyond a certain electrical charge quantity as shown in the signal L1 of FIG. 12A for example. However, if the vertical transfer circuit 202, the horizontal transfer circuit and/or the output amplifier 204 is designed not to saturate with regard to electrical charge when adding electrical charges of pixels, the synthesizing processing can be performed by adding electrical charges of pixels in the image-capturing element to obtain the signal L of FIG. 12B.

Fourth Embodiment

The following is an explanation of the fourth embodiment given in reference to the drawings.

Figure 19:
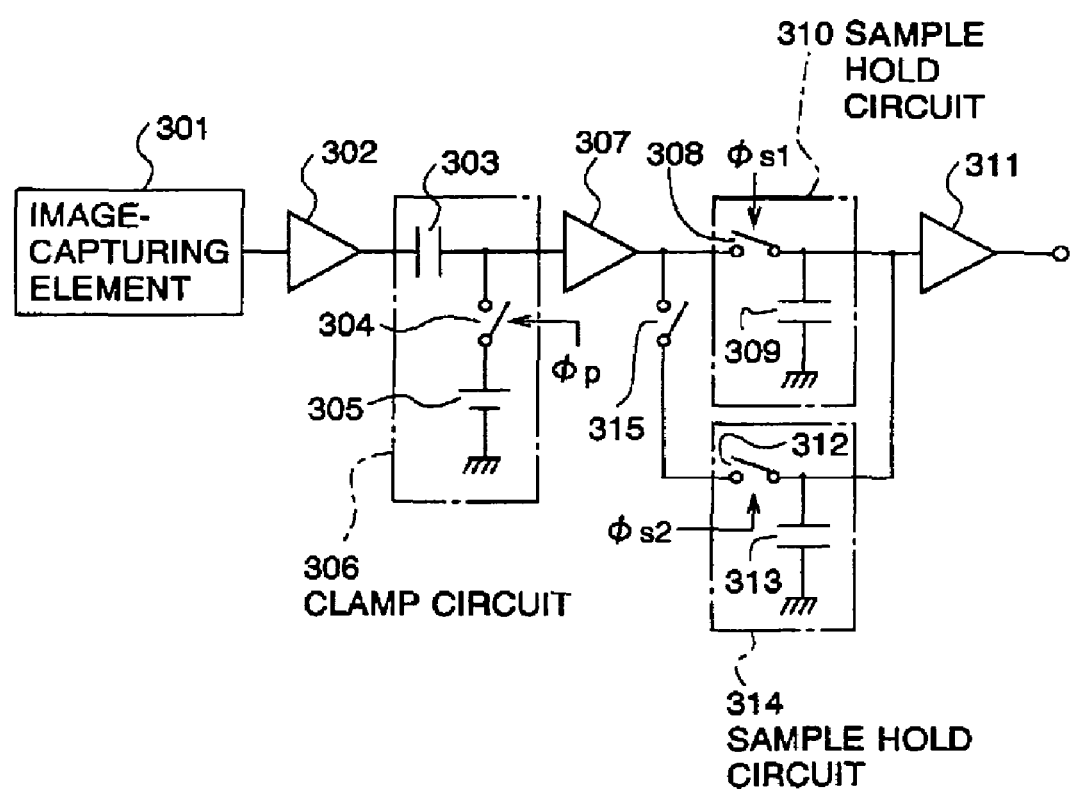
FIG. 19 illustrates the structure of the CDS circuit in a fourth embodiment of the present invention.
Figure 25:
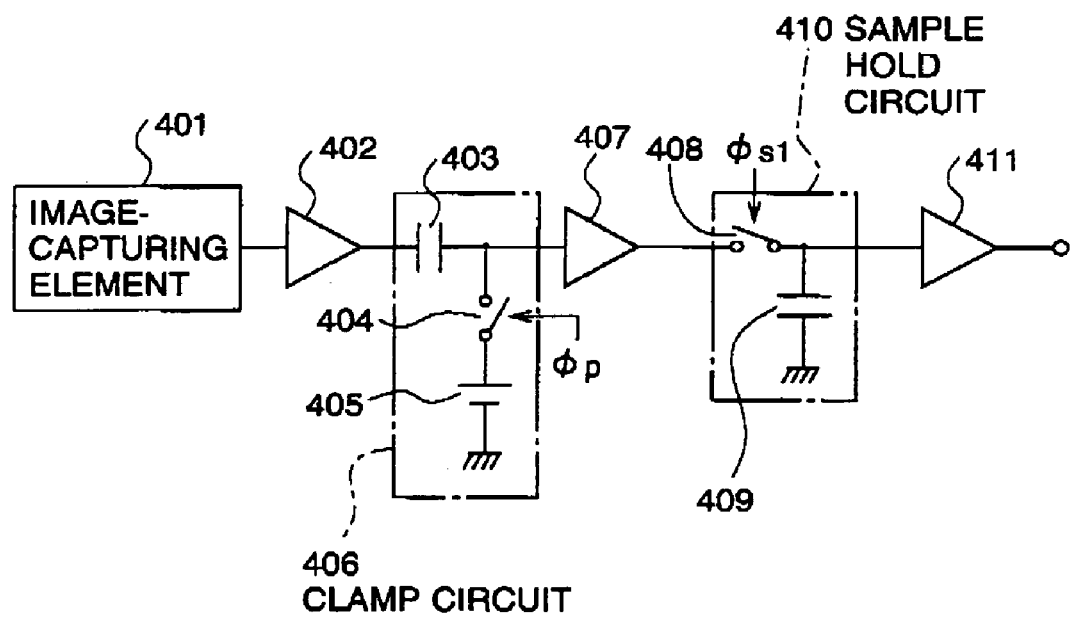
FIG. 25 illustrates the structure of a CDS circuit in the prior art.
Figure 26:
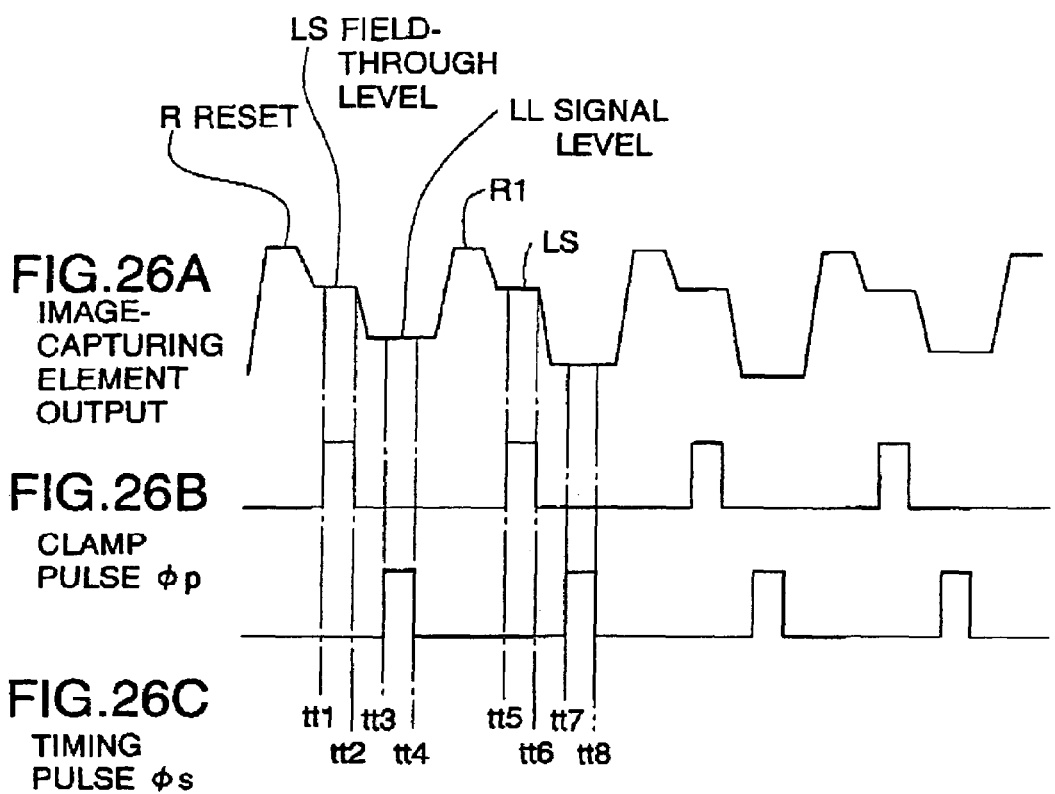
FIGS. 26A through 26C are operational timing charts of the CDS circuit in the prior art.

FIG. 19 illustrates the structure of the CDS circuit in the fourth embodiment constituting the image-capturing circuit according to the present invention. The CDS circuit illustrated in FIG. 19 is constituted basically by providing a plurality of sample hold circuits 110 one of which is provided in the CDS circuit in FIG. 25. In the CDs circuit in FIG. 19, the electrical charge that has undergone photoelectric conversion and has been transferred at an image-capturing element 301 is output to a clamp circuit 306 via a buffer amplifier 302 as an image capture signal.

The clamp circuit 306 outputs the output from the buffer amplifier 302 via a coupling capacitor 303, and also, applies a voltage provided by a DC voltage source 305 to the output side of the coupling capacitor 303 through operation of a switch 304 with the timing of a timing pulse øp. Thus, the image-capture signal from the coupling capacitor 303 is clamped at the field-through level LS to remove the reset noise, the output amplifier noise and the like generated at the image-capturing element 301.

The image-capture signal output from the clamp circuit 306 is then output, at least, to a sample hold circuit 310 via a buffer amplifier 307. In addition, through a switch 315, the image-capture signal output by the clamp circuit 306 is also output to a sample hold circuit 314 via the buffer amplifier 307 when the switch 315 is in an ON state. In other words, when the switch 315 is set to ON, a parallel input of the image-capture signal to the sample hold circuits 310 and 314 is enabled, whereas when the switch 315 is in an OFF state, the image-capture signal is input only to the sample hold circuit 310.

The sample hold circuit 310 samples the image-capture signal provided by the buffer amplifier 307 using a clamp pulse øs1 input to a switch 308, and outputs the level of the signal held at a holding capacitor 309 as an image-capture signal. Next, the image-capture signal at the signal level L1 output by the sample hold circuit 310 is output via a buffer amplifier 311, is subsequently converted to a digital signal at an A/D converter (not shown) and desired image data that have undergone various types of signal processing are output.

The sample hold circuit 314, on the other hand, samples the image-capture signal provided by the buffer amplifier 307 using a clamp pulse øs2 input to a switch 312, and outputs the level of the signal held at a holding capacitor 313 as an image-capture signal. Next, the image-capture signal at the signal level L2 output by the sample hold circuit 314, too, is output via a buffer amplifier 311 as is the image-capture signal at the signal level L1, and is subsequently converted to a digital signal at an A/D converter (not shown), and desired image data that have undergone various types of signal processing are output.

Next, the operation performed by the CDS circuit illustrated in FIG. 19 is explained in reference to the timing chart in FIGS. 20A through 20D.

Figure 20:
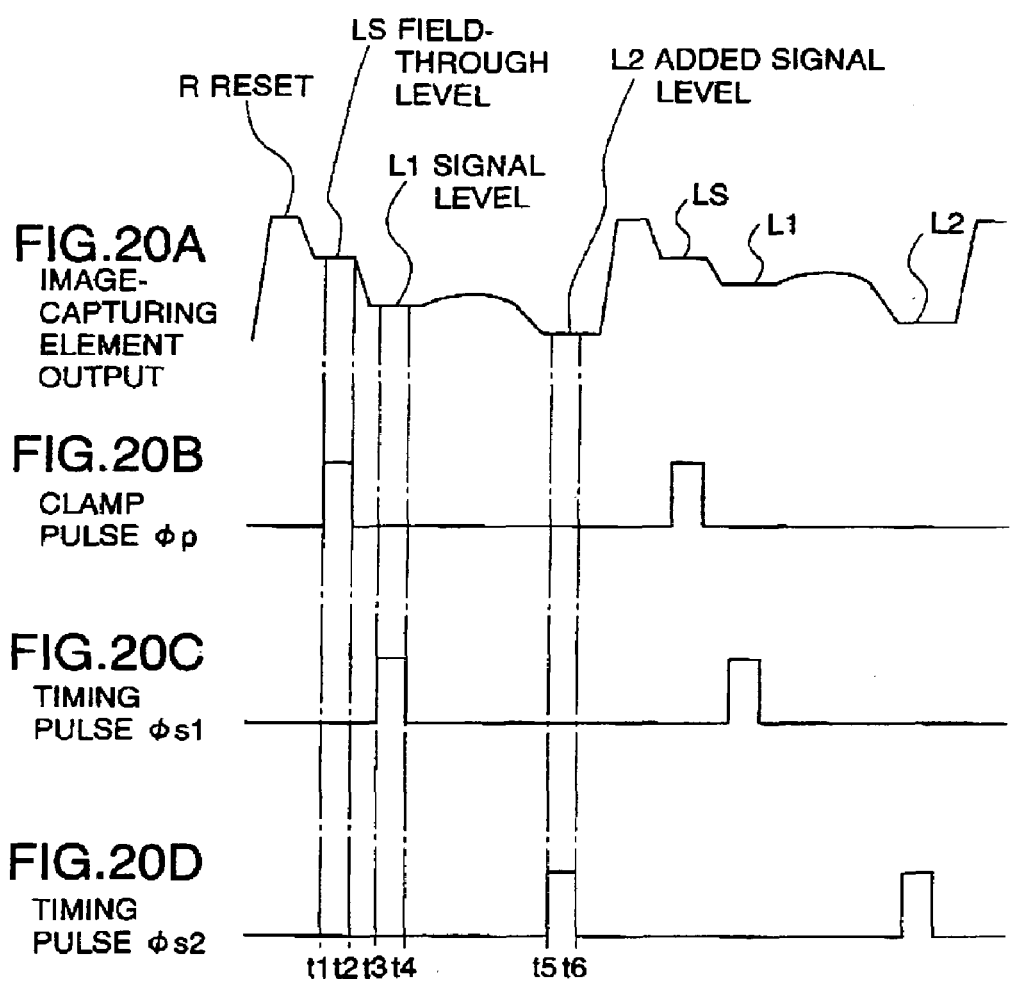
FIGS. 20A through 20D are timing charts illustrating the operation of the CDS circuit in FIG. 19.

As shown in FIG. 20A, the image-capture signal output by the image-capturing element 301 via the buffer amplifier 302 is sequentially transferred and output as an image-capture signal having a signal level L1 achieved through a conversion at the individual photoelectric conversion elements at the image-capturing element 301 and having an added signal level L2 achieved by adding the signal level of the electrical charge at the pixel, which is transferred next to the signal level L1, to the signal level L1. Namely, the image-capturing element output is achieved by combining image-capture signals that include the signal level L1 achieved without any addition and the added signal level L2 achieved through addition, and a reset R is implemented every this combination.

The clamp pulse øp shown in FIG. 20B is applied during the period of time elapsing between a time point t1 and a time point t2 following a reset R, and the image-capturing element output is clamped at the field-through level LS that has been applied to be adjusted to the reference level, which does not contain any noise.

Next, the timing pulse øs1 shown in FIG. 20C is supplied to the sample hold circuit 310 during the period of time elapsing between a time point t3 and a time point t4, and the signal level L1 after clamping is sampled using this timing pulse øs1 and is held. The signal level L1 thus held is output as an image-capture signal. In other words, the signal level L1 referring to the field-through level LS is output.

Then, the timing pulse øs2 shown in FIG. 20D is supplied to the sample hold circuit 314 during the period of time elapsing between a time point t5 and a time point t6, and the added signal level L2 after clamping is sampled using this timing pulse øs2 and is held. The added signal level L2 thus held is output as an image-capture signal. In other words, the added signal level L2 referring to the field-through level LS is output.

In this case, since another reset R and processing for clamping the signal at the field-through level LS are not implemented for taking out the added signal level L2, the reset R and the clamp processing are utilized effectively.

In addition, when the switch 315 is in an ON state, the signal level L1 and the added signal level L2 are sampled using the sampling pulses øs1 and øs2 that are sequentially supplied to the sample hold circuits 310 and 314 respectively, and these single levels are sequentially output via the buffer amplifier 311. If, on the other hand, the switch is in an OFF state, only the signal level L1 is output via the buffer amplifier 311.

It is to be noted that when the added electrical charges are to be further output from an FDA continuously, a plurality of sample hold circuits, the number of which correspond to the number of continuous addition operations, should be provided so that the sampling pulses for sampling the individual signal levels achieved through addition are supplied to the individual sample hold circuits for sample holding. In addition, the switch 315 should be employed as a selector switch for switching the connection states of the plurality of sample hold circuits.

Now, an image-capturing element 301, in which the electrical charges at the individual pixels are output while they are being added together by an FDA is explained.

Figure 21:
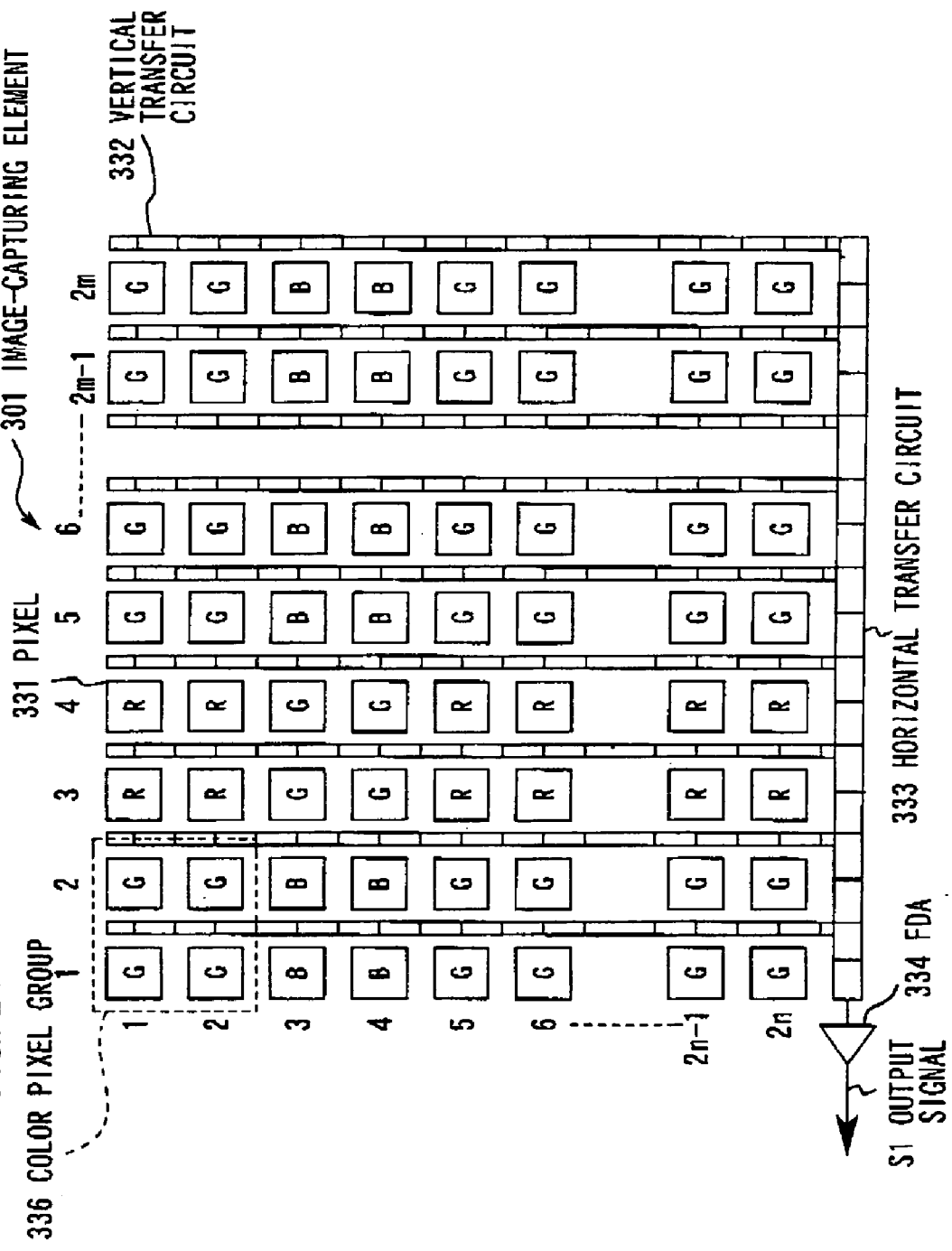
FIG. 21 illustrates the structure of an image-capturing element.
Figure 22:
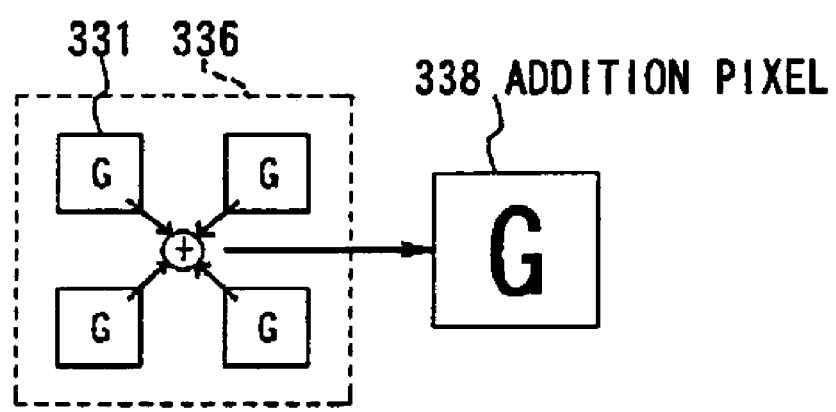
FIG. 22 illustrates a mode for arraying individual pixels in a color pixel group and the resulting addition pixel.

FIG. 21 illustrates the structure of the image-capturing element 301. In FIG. 21, the image-capturing element 301 constitutes a color pixel matrix achieved by arraying a plurality of pixels 331, 2m of which are provided in the horizontal direction (the direction of rows) and 2n of which are provided in the vertical direction (the direction of columns). The color pixel matrix is constituted of m×n color pixel groups 336 in each of which all of the 2×2 pixels=4 pixels adjacent to each other vertically and horizontally are of a single color component.

When the color pixel matrix is regarded in units of the m×n individual color pixel groups 336, the color pixel matrix adopts an RGB Bayer array. For instance, the four pixels, i.e., M(1,1). M(1,2) M(2,1) and M(2.2) in the 2 m×2 n color pixel matrix M all have a color filter with the color component G, the four pixels i.e., M(1,3) M(1,4) M(2,3) and M(2,4) all have a color filter with the color component R, the four pixels i.e., M(3.1) M(3,2) M(4,1) and M(4,2) all have a color filter with the color component B and the four pixels i.e. M(3.3) M(3,4) M(4.3) and M(4,4) all have a color filter with the color component G in this array.

The pixels 331 each constituted with a photoelectric conversion element such as a photodiode each function as an R, G or B color component pixel, and the individual pixels 331 having this function are each provided with a color filter at the upper surface thereof that allows light having the R, G or B color component to be transmitted. As a result, the pixel 331 at the color pixel matrix M(1,1) for instance, allows transmission of only the light with the G (green) color component, receives it and performs photoelectric conversion on it. It is to be noted that both m and n are natural numbers.

The electrical charges stored at the four individual pixels within each color pixel group 336 are added together on the image-capturing element 301, and an output signal S adopting a mode whereby added electrical charges achieved through such addition are sequentially transferred adjacent to each other is output from the image-capturing element 301.

Namely, the individual pixels 331 are output onto vertical transfer circuits 332 in synchronization with each other, the pixels adjacent to each other in the vertical direction within the color pixel group 336 are then added together at the vertical transfer circuits 332 and the results of the addition are output to the horizontal transfer circuit 333. The horizontal transfer circuit 333 then transfer the addition pixels, which have been transferred from the vertical transfer circuit 332 sequentially in units of individual stages, to a floating diffusion amplifier (FDA) 334.

The FDA 334 further adds together the addition pixels adjacent to each other in the horizontal direction in each color pixel group 336 to generate an addition pixel 338 achieved by adding together the electrical charges at all the pixels within the color pixel group 336. It is to be noted that while, when adding the signal level of the next pixel to the signal level of the first pixel during the process for generating an addition pixel, the signal level of the first pixel is held and the signal level of the following pixel is added to the signal level that has been held, the signal level of the first pixel is also output to the CDS circuit as in the image-capture signal output illustrated in FIG. 20A as a portion of the output signal S1 concurrently as the signal level is held. As a result, the signal level L1 in FIG. 20A represents the added electrical charge level achieved by adding together the electrical charges at the pixels adjacent to each other in the vertical direction within the color pixel group 336 and the added signal level L2 represents the added electrical charge level achieved by adding together the electrical charges at all the pixels within the color pixel group 336.

It is to be noted that such addition to be performed on the image-capturing element 301 can be easily achieved by controlling the drive of the image-capturing element 301 in its electrical charge transfer operation.

Figure 23:
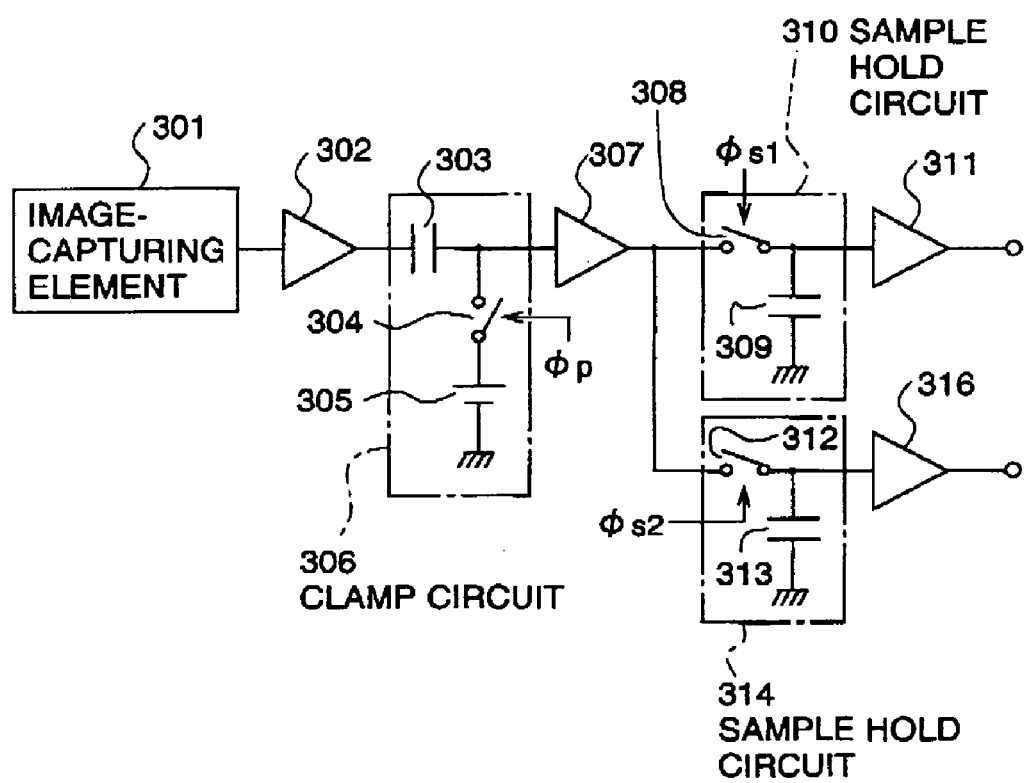
FIG. 23 illustrates the structure of variation 1 of the CDS circuit.

Next, variation 1 of the CDS circuit is explained. As illustrated in FIG. 23, variation 1 assumes a structure achieved by eliminating the switch 315 from the CDS circuit illustrated in FIG. 19, which allows the individual sample hold circuits 310 and 314 to achieve a parallel output via buffer amplifiers 311 and 316 respectively, independently of each other.

As a result, the signal level L1 achieved without addition and the signal level L2 achieved through addition are respectively output through the buffer amplifiers 311 and 316 at all times with the generation of the sampling pulses øs1 and øs2.

Figure 24:
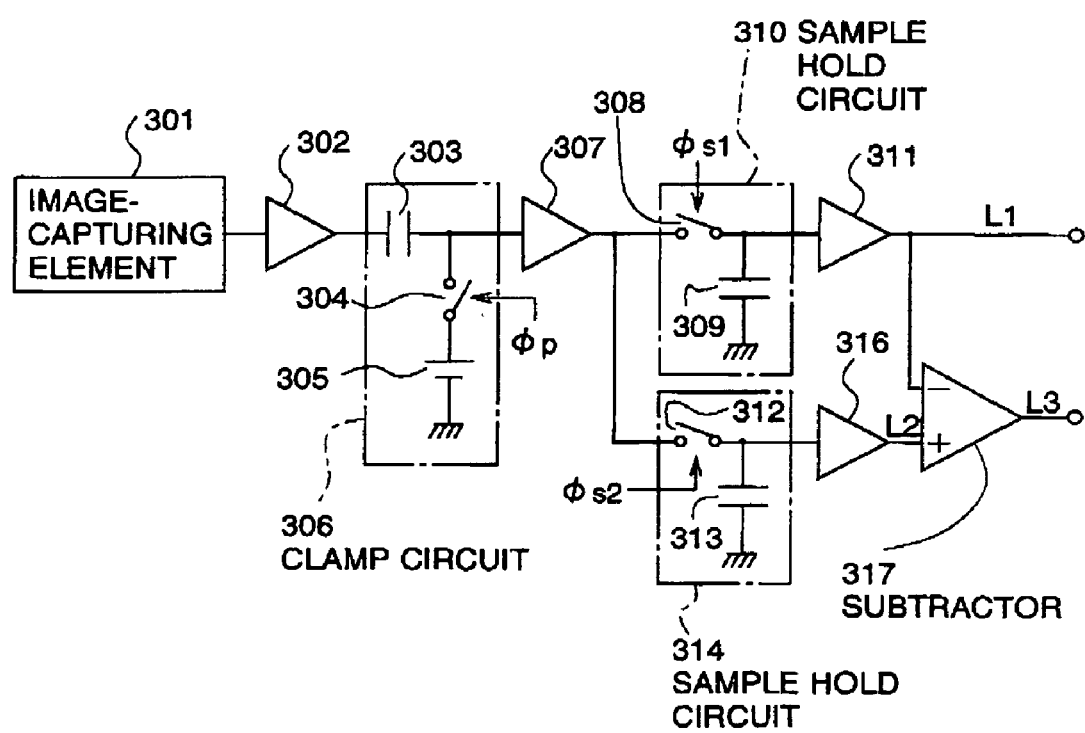
FIG. 24 illustrates the structure of variation 2 of the CDS circuit.

Now, variation 2 of the CDS circuit is explained. Variation 2 assumes a structure achieved by adding a subtractor 317 to the CDS circuit illustrated in FIG. 23, as illustrated in FIG. 24. In FIG. 24, a signal level L3 achieved by subtracting the signal level L1 output via the buffer amplifier 311 from the added signal level L2 output via the buffer amplifier 316, i.e., a signal level L3 which is transferred next to the signal level L1 achieved without addition, can be obtained. In addition, the signal level L1 output via the buffer amplifier 311 is output unchanged. Consequently, the signal level L1 and the signal level L3 can be output in parallel.

Thus, with A representing the level value of the signal level L1 and B representing the level value of the signal level L3, A and A+B can be alternately output in series in the embodiment, A and A+B can be output in parallel in variation 1 and A and B can be output in parallel in variation 2.

It is to be noted that while the individual color pixel groups 336 in the color pixel matrix within the image-capturing element 301 each have 2×2=4 pixels, the present invention is not limited to this example and a structure adopting any array mode with an arbitrary number of pixels in each color pixel group, such as 1×2=2 pixels, 3×3=9 pixels and 3×2=6 pixels, may be assumed.

In addition, while the image-capturing element 301 is explained above on the premise that it is constituted of a CCD solid image-capturing element, the present invention is not limited to this example and it is obvious that it may be adopted in an amplifier type solid image-capturing element that takes out electrical charges stored within the individual pixels 331 through switching processing performed on the individual pixels 331.

Since the structure of an electronic camera constituting an image-capturing device employing one of the CDS circuits described above is identical to the structure of the electronic camera in the first embodiment illustrated in FIGS. 4 and 5 except for the CDS circuit, the following explanation is given in reference to FIGS. 4 and 5. The explanation of the individual components is omitted.

The operating unit 25 includes a photographing mode selector switch for switching among various photographing modes and a command dial for setting various commands.

Through the photographing mode selector switch at the operating unit 25, a high resolution mode for outputting a color image in units of the individual pixels 331 in the color pixel matrix, a high sensitivity mode for outputting a color image in units of the color pixel groups 336 or an auto mode for automatically switching between the high resolution mode and the high sensitivity mode depending upon the photographing environment including the brightness and the like is selected and specified.

When the high resolution mode is specified, the CPU 21 notifies the DSP 14 that the high resolution mode has been set. The DSP 14, in turn, generates a drive timing pulse for transferring electric charges, adding together the two pixels adjacent to each other in the vertical direction in each color pixel group 336, and outputting the signal, to drive the image-capturing element 301. In addition, the signal processing that supports color image output is implemented on the output signal via the A/D converter 13.

At this time, the CDS circuit within the CDS/AGC circuit 12 only outputs the signal level L1 sampled and held by the sample hold circuit 310. In addition, the CPU 21 engages in the control in which instructions corresponding to the high resolution mode are issued to the other components.

When the high sensitivity mode is specified, the CPU 21 notifies the DSP 14 that the high sensitivity mode has been set. The DSP 14, in turn, generates a drive timing pulse whereby the four pixels within each color pixel group 336 are added together to drive the image-capturing element, and also performs image processing on the output signal via the A/D converter 13. At this time, the CDS circuit within the CDS/AGC circuit 12 only outputs the added signal level L2 sampled and held by the sample hold circuit 314. In addition, the CPU 21 engages in the control in which instructions corresponding to the high sensitivity mode are issued to the other components.

If the auto mode is specified, the CPU 21 notifies the DSP 14 that the auto mode has been set. The DSP 14 generates a drive timing pulse for the image-capturing element 301 using, for instance, the high resolution mode as the default mode, monitors the brightness component based upon the output signal from the image-capturing element 301, makes a decision as to whether or not the brightness component is equal to or less than a specific value and switches to the high sensitivity mode if the results of the decision-making indicate that the brightness component is equal to or less than the specific value, whereas it sustains the high resolution mode if the brightness component is not equal to or less than the specific value.

FIG. 5 presents a plan view of the electronic camera. At the electronic camera main body 31, the photographing mode selector switch 32, the command dial 33, the LCD 34 and the release switch 35 are provided. The photographing mode selector switch 32, the command dial 33 and the release switch 35 are part of the operating unit 25 illustrated in FIG. 4, with the LCD 34 corresponding to the LCD 23 in FIG. 4. The photographing mode selector switch 32 is provided to select a mode among the three modes, i.e., the high resolution mode, the high sensitivity mode and the auto mode, and the mode setting thus selected is indicated on the LCD 34. In addition, the command dial 33 is employed in an operation for setting the shutter speed, the aperture value and the like, and the results of the settings operation and the like are indicated on the LCD 34.

Thus, through the electronic camera, a desired color image is achieved by selecting the high resolution mode, the high sensitivity mode or the auto mode for automatically switching between the high resolution and the high sensitivity mode in correspondence to the photographing environment using the results of the output from the CDS circuit achieving a high degree of efficiency provided inside the CDS/AGC circuit 12.

In other words, since the CDS circuit according to the present invention is provided with a plurality of sample hold circuits, the signal levels corresponding to the signal electrical charges achieved without addition and the signal electrical charges achieved through addition can be extracted continuously through a simple structure, and these signal levels can be output in an arbitrary manner. As a result, an image achieving a high degree of sensitivity or an image with a high degree of resolution can be output.

Fifth Embodiment

The following is an explanation of the fifth embodiment, given in reference to the attached drawings.

Figure 30:
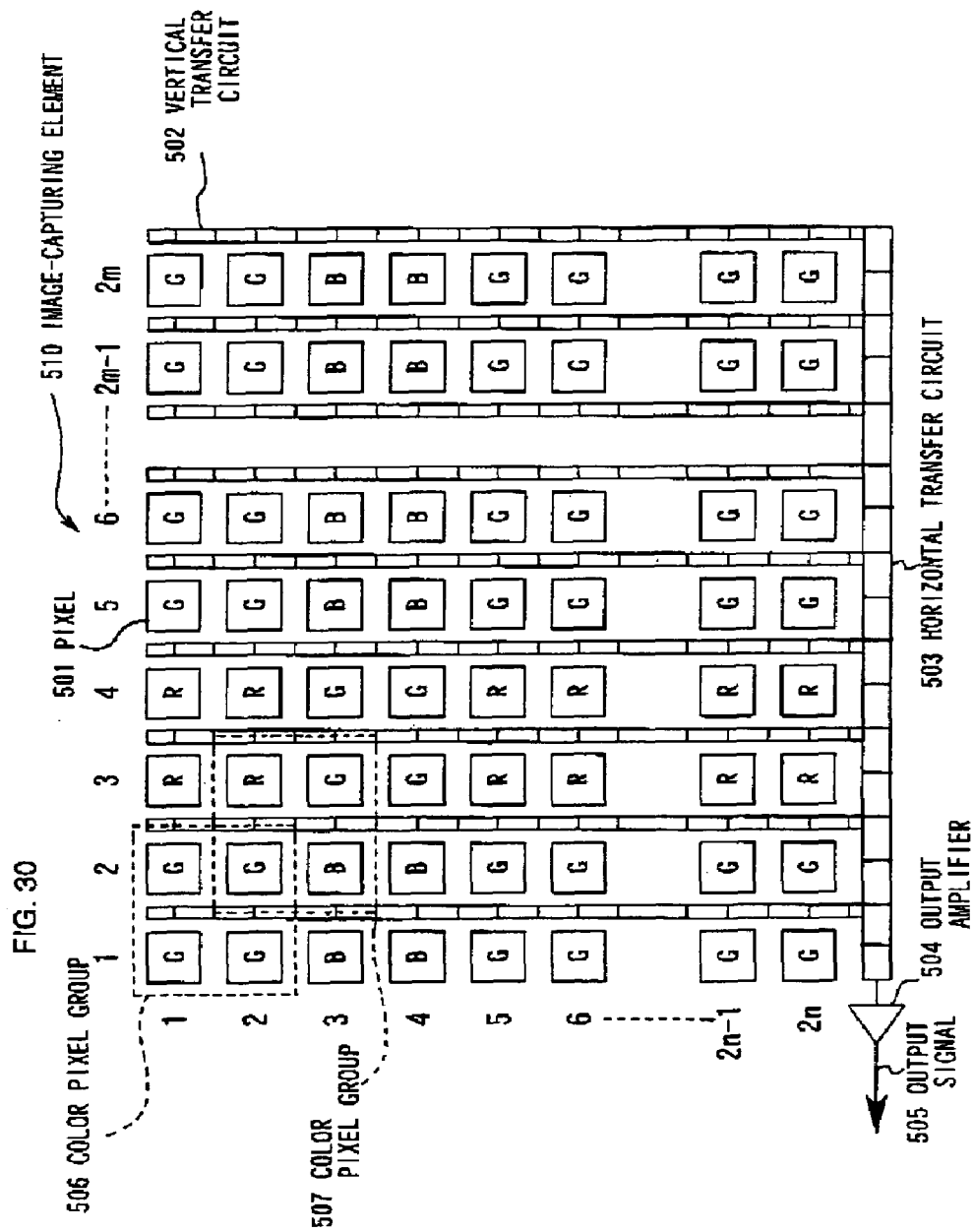
FIG. 30 illustrates the structure of the image-capturing element in a fifth embodiment of the present invention.

FIG. 30 illustrates the structure of the image-capturing element employed in the fifth embodiment. The image-capturing element 510 constitutes a color pixel matrix achieved by arraying a plurality of pixels 501, i.e., 2m pixels 501 along the horizontal direction (the direction of rows) and 2n pixels 501 along the vertical direction (the direction of columns). The color pixel matrix comprises m×n color pixel groups 506 each constituted of 2×2=4 pixels of a single color adjacent to each other in the vertical and horizontal directions.

The m×n color pixel groups 506 in the color pixel matrix are arranged in an RGB Bayer array. For instance, 4 pixels M(1,1), M (1,2), M(2,1) and M(2,2) in the 2 m×2n color pixel matrix each have a color filter with the color component G in the array, 4 pixels M(1,3), M (1,4), M(2, 3) and M(2, 4) each have a color filter with the color component R in the array, 4 pixels M(3,1). M (3,2), M(4, 1) and M(4,2) each have a color filter with the color component B in the array and 4 pixels M(3,3), M (3,4), M(4,3) and M(4,4) each have a color filter with the color component G in the array. In the explanation, a pixel M(i, j) indicates a pixel at row i, column j.

These pixels 501, each constituted of a photoelectric conversion element such as a photodiode, function as a pixel with the R, G or B color component. This function is achieved by providing the color filter described above that allows light with the R. G or B color component to be transmitted on the upper surface of each pixel 501. Thus, the pixel 501 i.e., the pixel M(1,1) in the color pixel matrix, for instance, allows only light with the G (green) color component to be transmitted to the element for photoelectric conversion. It is to be noted that the m and n each represent a natural number.

Figure 31:
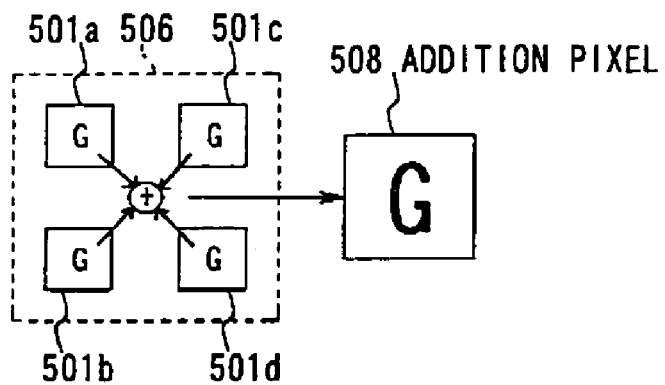
FIG. 31 illustrates the principle through which a color image is achieved by adding together the electrical charges in color pixel groups.

As illustrated in FIG. 31, the electrical charges stored at the 4 pixels in each color pixel group 506 are added together at the image-capturing element 510, and electrical charges each resulting from the addition of a given color pixel group are sequentially transferred and output to achieve an output signal 505.

Figure 32:
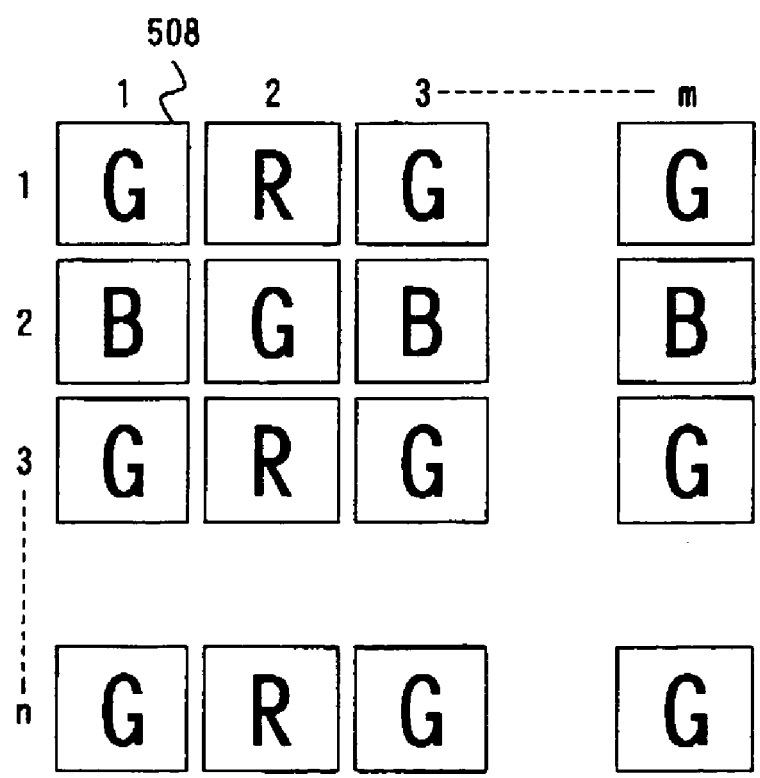
FIG. 32 illustrates a pixel array for producing a color image by adding together the electrical charges in color pixel groups.

As a result, as illustrated in FIG. 32, the pixels are arranged in an RGB Bayer array achieved in units of the individual color pixel groups 506. The Bayer array in this example is achieved by arraying the color component G in accordance with the brightness signal in a checkered pattern with the color component R and the color component B arrayed in a checkered pattern in the remaining area, as illustrated in FIG. 32. The color component R and the color component B are arrayed on alternate lines along the horizontal direction (the direction of rows) or the vertical direction (the direction of columns). It is to be noted that the conceptual details of the Bayer array are of the known art.

The modes of addition that may be adopted by the image-capturing element 510 include the following.

In the first mode, the electrical charges at two pixels, e.g., pixels 501a and 501b or pixels 501c and 501d, along a single column in the longitudinal direction in each color pixel group 506 are added together on a vertical transfer circuit 502, and the individual pixels resulting from such addition are added together on an output amplifier 504 constituted of an FDA (floating diffusion amplifier).

In the second mode, the electrical charges are sequentially transferred onto a vertical transfer circuit 502 in units of two pixels 501a and 501b or 501c and sold provided along a single column in the longitudinal direction in each color pixel group 506, the electrical charges at each two pixels along a single column in the longitudinal direction are added together on a horizontal transfer circuit 503 when they are transferred to the horizontal transfer circuit 503 and pixels each resulting from such addition are then added together at the output amplifier 504.

In the third mode, the electrical charges at the individual four pixels are output only to the vertical transfer circuit 502 present between the two columns along the longitudinal direction (between the pixels 501a, 501b and the pixels 501c, 501d) among the four pixels in a given color pixel group 506, the electrical charges at the two pixels 501a and 501c along the lateral row are added together on the vertical transfer circuit 502 and then pixels each resulting from such addition of the electrical charges at pixels laterally along the row are added together longitudinally at the vertical transfer circuits 502.

Such addition performed on the image-capturing element 510 can be implemented easily by controlling the drive of the electrical charge transfer to the image-capturing element 510.

When adding together the electrical charges at the four pixels in each color pixel group 506 during the process in which an output signal 505 is output at the image-capturing element 510 in this manner, the quantity of the electrical charge corresponding to the R, G or B color component in each color pixel group 506 is four times the electrical charge quantity of a single pixel, which leads to an improvement in sensitivity.

Figure 33:
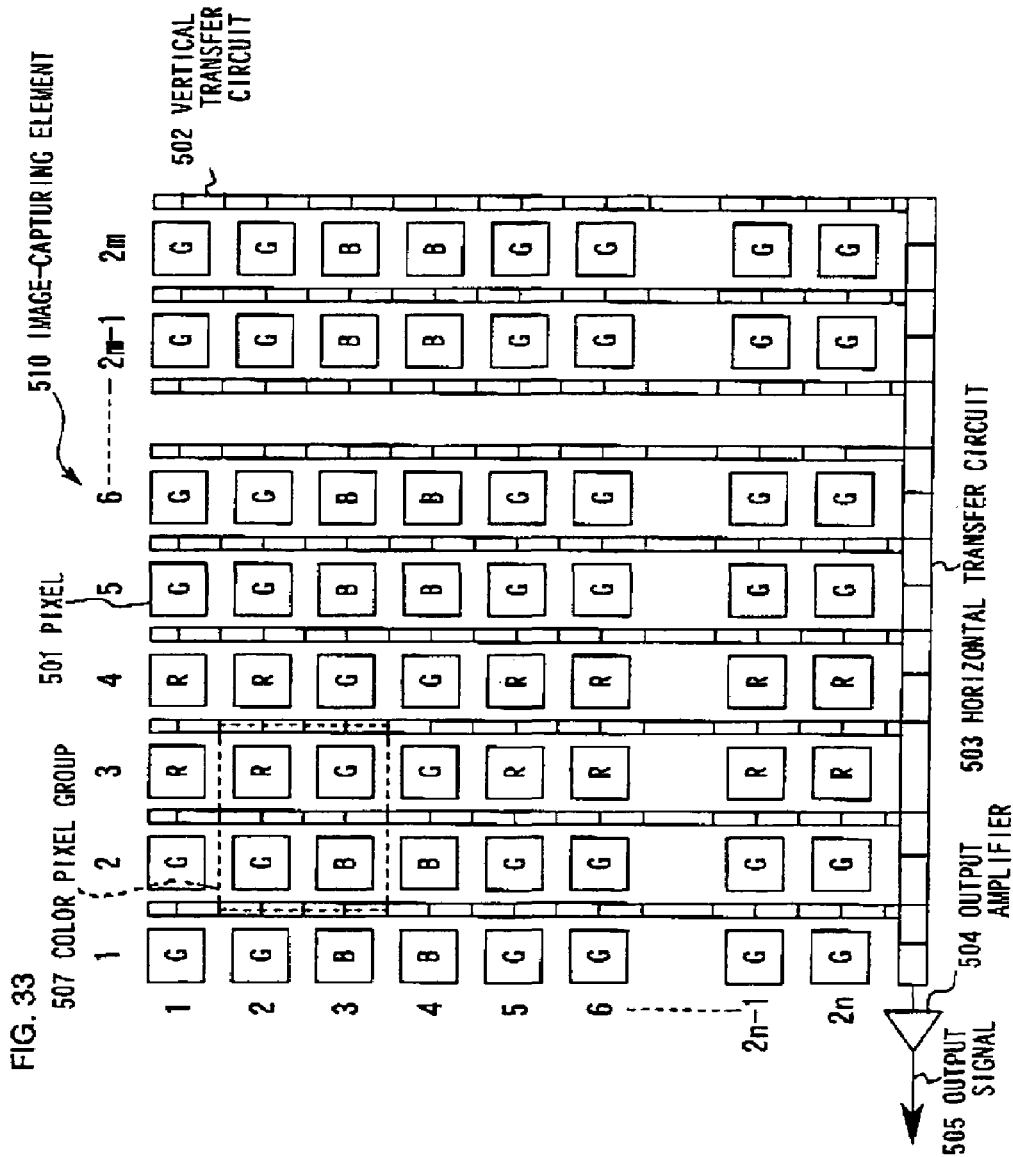
FIG. 33 illustrates the structure of the image-capturing element of the fifth embodiment.
Figure 34:
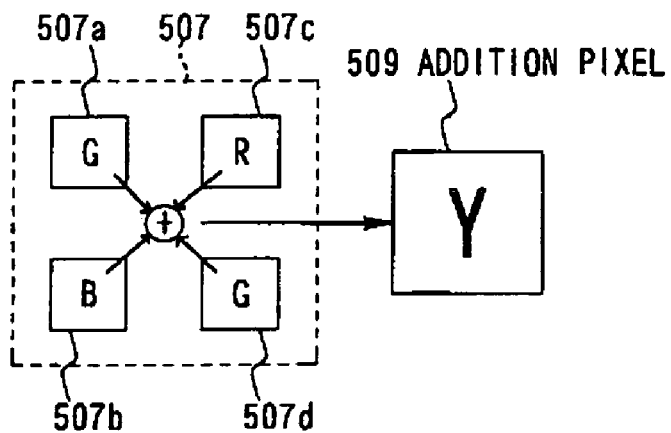
FIG. 34 illustrates the principle through which a black and white image is achieved by adding together the electrical charges in a color pixel group.

Next, let us focus on four pixels M(2,2), M(2,3), M (3,2) and M(3,3) in the color pixel matrix at the image-capturing element 510 in FIG. 33. The color pixel group 507 comprising these four pixels achieves an RGB Bayer array (G×2, R×1, B×1), and the color pixel groups adjacent to it each achieve a pixel array of the same combination, too. Thus, by adding together the electrical charges of the four pixels 507a–507d in each color pixel group 507, as illustrated in FIG. 34, while excluding the pixels in the uppermost row, the lowermost row, the left end column and the right end column in the 2m×2n color pixel matrix, addition pixels 509 each corresponding to a brightness signal Y can be directly obtained from the image-capturing element 510.

In this case, the control of the drive of electrical charge transfer to the image-capturing element 501 can be implemented by shifting both the vertical transfer pulse and the horizontal transfer pulse by one pixel. In addition, it is obvious that the addition processing for the individual color pixel groups 507 can be realized easily by adopting the addition processing performed for the color pixel groups 506.

Figure 35:
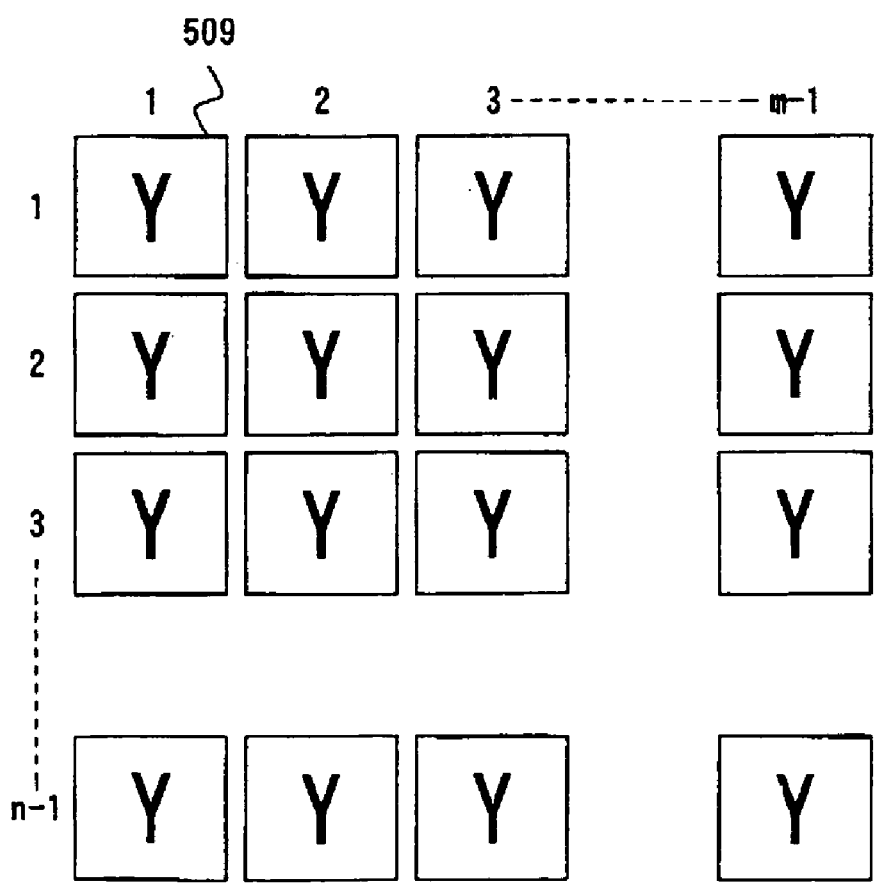
FIG. 35 illustrates a pixel array for producing a black and white image by adding together the electrical charges in color pixel groups.

However, as illustrated in FIG. 35, the addition pixels 509 thus obtained achieve an (m−1)×(n−1) pixel matrix and, consequently, the vertical transfer pulse and the horizontal transfer pulse must be supplied by taking into consideration this point.

As a result, a black and white (monochrome, monotone) image generated by using the addition pixels 509 alone achieves higher resolution compared to a black and white image generated based upon addition pixels 506, and furthermore, the brightness signals can be directly obtained from the image-capturing element 510.

It is to be noted that while the brightness signals must satisfy a relationship of Y=0.299R+0.587G+0.144B, in principle, a relationship expressed as
Y=R+2G+B may be adopted in approximation.

Since the structure of an electronic camera constituting an image-capturing device that employs the image-capturing element 510 illustrated in FIG. 30 or FIG. 33 is similar to the structure shown in FIGS. 4 and 5 illustrating the first embodiment, the following explanation is given in reference to FIGS. 4 and 5. An explanation of the individual components is omitted.

An operating unit 25 includes photographing mode selector switches operated to switch to various photographing modes and a command dial operated to set various commands.

Namely, by operating the operating mode selector switches at the operating unit 25, an instruction is issued to switch to either the color image mode or the high resolution black and white image mode.

In conformance to such an instruction to switch to the color image mode or the black and white image mode, the control of the drive of the image-capturing element 510 in the color image mode or the control of the drive of the image-capturing element 510 in the black and white image mode is implemented as described earlier. When the color image mode is selected, a CPU 21 indicates to a DSP 14 that the color image mode has been set, and the DSP 14, in response, generates a drive timing pulse for adding together the electrical charges at the four pixels in each color pixel group 506 to drive the image-capturing element 510 via a timing generator 20. In addition, signal processing which corresponds to the color image output is performed on an image-capturing signal input via an A/D converter 13. The CPU 21 also implements control of the other components by issuing relevant instructions corresponding to the color image mode.

When the black and white image mode is selected, the CPU 21 indicates to the DSP 14 that the black and white image mode has been set, and in response, the DSP 14 generates a drive timing pulse for adding together the electrical charges at the four pixels in each color pixel group 507 to drive the image-capturing element 510 via the timing generator 20. In addition, signal processing is performed on the image-capturing signal input via the A/D converter 13. The CPU 21 also implements control of the other components by issuing relevant instructions corresponding to the black and white image mode.

Figure 36:
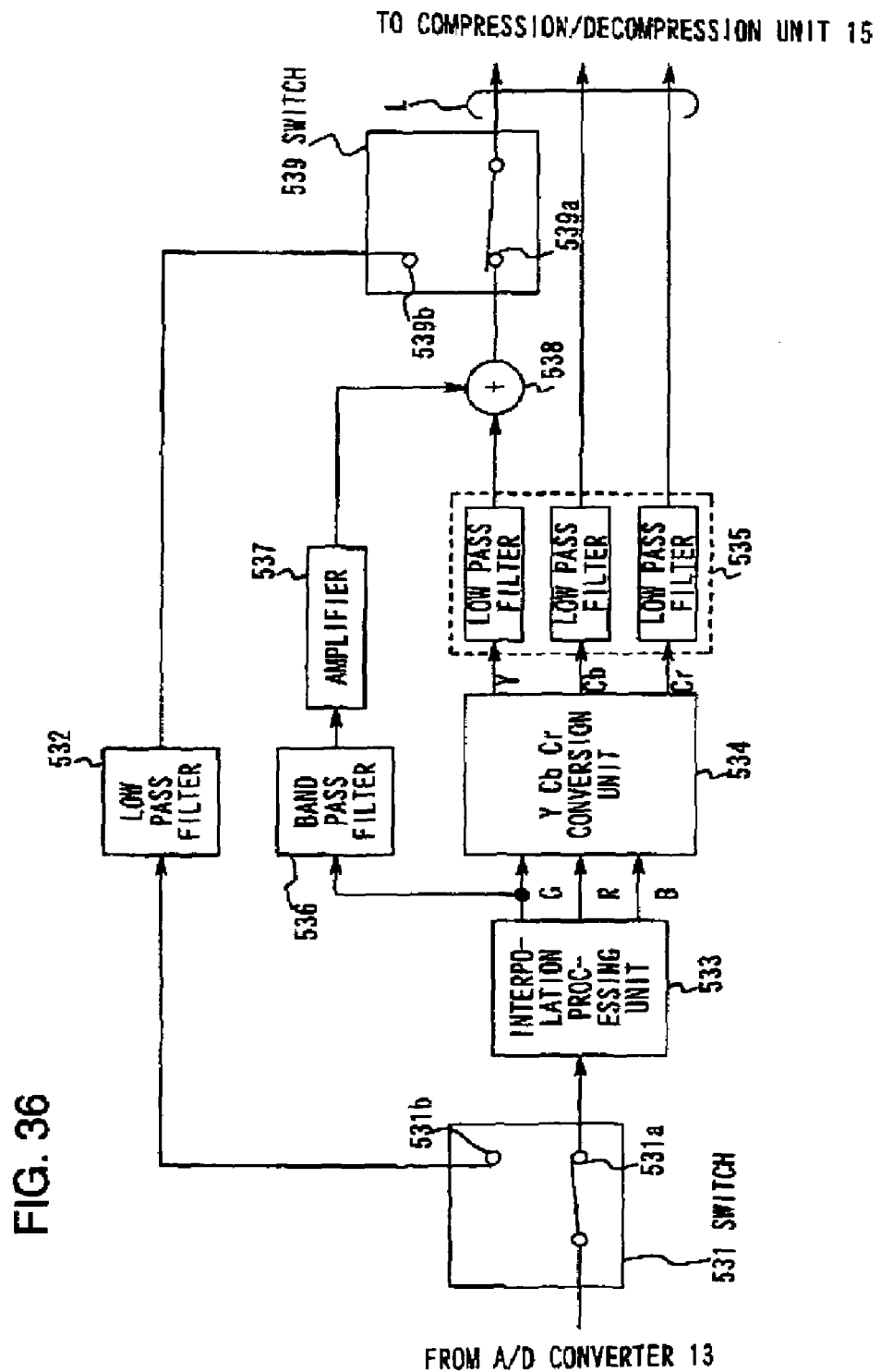
FIG. 36 is a block diagram illustrating in detail the functional structure of the DSP in FIG. 4.

Next, in reference to FIG. 36, a detailed explanation is given on the functional structure of the DSP 14. In FIG. 36, the DSP 14 is provided with two selector switches 531 and 539. When the color image mode is selected, the switch 531 is connected to a terminal 531*a* and the switch 539 is connected to a terminal 539*a*, when the black and white image mode is selected, on the other hand, the switch 531 is connected to a terminal 531*b* and the switch 539 is connected to a terminal 539*b*.

When the color image mode is selected, an image-capturing signal corresponding to an addition pixel 508 representing each color pixel group 506 is input from the A/D converter 13 as explained earlier, and this image-capturing signal is input to an interpolation processing unit 533 via the terminal 531*a* of the switch 531, where the image-capturing signal undergoes a specific type of interpolation processing. The color component signals G, R and B having undergone the interpolation processing then undergo matrix conversion to generate Y, Cb and Cr, which is output to a compression/decompression unit 15 through an output line L via low pass filters 535. During this process, the color component signal C output from the interpolation processing unit 533 extracts outlines in the image via a band pass filter 536, and a signal achieved by amplifying the extracted signal at an amplifier 537 is then added to the brightness signal Y via an adder 538. Thus, the brightness signal Y becomes a signal with the emphasized outlines in the image.

It is obvious that when the image is ultimately output with the RGB calorimetric system, the color component signals G, R and B may be directly output to the compression/decompression unit 15 from the output line L via the low pass filters 535, without providing the YCbCr conversion unit 534.

When the black and white image mode is selected, on the S other hand, an image-capturing signal constituting the brightness signal corresponding to an addition pixel 509 representing each color pixel group 507 is input from the A/D converter 13 as explained earlier, and this image-capturing signal is output to the terminal 539*b* of the switch 539 via the terminal 531*b* of the switch 531 and a low pass filter 532. The terminal 539*b* is connected to the output line through which the brightness signal Y is output when the color image mode is selected. Thus, the image-capturing signal is output directly to the compression/decompression unit 15 as the brightness signal Y.

As explained above, in the electronic camera in the fifth embodiment, a single image-capturing element 510 is employed and a signal processing circuit or software to perform interpolation processing to generate black and white pixel signals from color pixel signals is not required. And color images and high resolution black and white images can be selectively output from the image-capturing element 510 directly simply by switching the drive control of the image-capturing element 510, thereby achieving an efficient image-capturing device. In addition, occurrence of jaggies that may otherwise manifest when signal processing is performed to produce a black and white image from color component pixels can be prevented.

It is to be noted that while the color pixel groups 506 at the image-capturing element 510 explained above each comprise 2×2=4 pixels, the present invention is not limited to this example and color pixel groups at the image-capturing element may each comprise any other number of pixels achieved by (even number)×(even number). For instance, the color pixel groups may each comprise 4×6=24 pixels. The number must be (even number)×(even number) to facilitate partitioning of the color pixel groups 506 to achieve the color pixel groups 507 required for obtaining a black and white image. For instance, color pixel groups each having 4×6=24 pixels can each be partitioned into pixel groups having 2×3=6 pixels in the horizontal and vertical directions respectively, and using those partitioned groups, new 4×6 color pixel groups that correspond to the color pixel groups 507 may be constituted In addition, in this case, the vertical transfer pulse should be shifted by 3 pixels and the horizontal transfer pulse should be shifted by 2 pixels. FIG. 37 presents an example of color pixel groups each having 4×6=24 pixels as described above. The color pixel groups 506 are each constituted of 4×6=24 pixels of a single color. The color pixel groups 507 are realized through a Bayer array achieved in units pixel groups each having 2×3=6 pixels representing a single color.

It is to be noted that while the explanation has been given above on the premise that the image-capturing element 510 is constituted of a CCD solid image-capturing element, the present invention is not limited to this example, and it is obvious that it may be adopted in an amplifier-type solid image-capturing element that sweeps out the electrical charges stored in the individual pixels 501 through switching processing performed on the individual pixels 501.

While the explanation has been given above on the first through fifth embodiments by using an example in which the present invention is adopted in an electronic camera, it is not limited to the particulars of the example. The image-capturing elements in the individual embodiments may be adopted in an electronic video camera. In other words, the present invention may be adopted in all types of image-capturing devices that employ an image-capturing element constituted of a plurality of pixels each having a photoelectric conversion element and provided in a matrix

What is claimed is:

1. An image-capturing element, comprising:
   a plurality of pixels provided in a matrix, each having a photoelectric conversion element, wherein:
   a green color filter is provided at each of 2×c pixels, a blue color filter is provided at each of 1×c pixels and a red color filter is provided at each of remaining 1×c pixels within a range of 4×c pixels adjacent to each other vertically and horizontally among said plurality of pixels, the c representing a natural number; and
   a read out circuit is further provided that adds electrical charges of the 4×c pixels adjacent to each other vertically and horizontally and enables a sequential read out of added electrical charges.

2. An image-capturing element according to claim 1, wherein:
   the green color filter, the blue color filter and the red color filter each achieve predefined spectral characteristics to enable said read out circuit to read out a brightness signal by adding together electrical charges of the 4×c pixels adjacent to each other vertically and horizontally.

3. An image-capturing device comprising:
   an image-capturing element having a plurality of pixels provided in a matrix each of which has a photoelectric conversion element, a green color filter being provided at each of 2×c pixels within a range of 4×c pixels adjacent to each other vertically and horizontally among said plurality of pixels, a blue color filter being provided at each of 1×c pixels within the range, a red color filter being provided at remaining 1×c pixels within the range, and a read out circuit that adds electrical charges at the 4×c pixels adjacent to each other vertically and horizontally and enables a sequential read out of added electrical charges, the c representing a natural number; and
   a drive circuit that provides said read out circuit with a drive signal to enable said read out circuit to add electrical charges of the 4×c pixels adjacent to each other vertically and horizontally and enables a sequential read out of added electrical charges.

4. An image-capturing device according to claim 3, wherein:
   said image-capturing element has (d×m in a horizontal direction)×(e×n in a vertical direction) pixels, the m, n, d and e representing natural numbers; and
   said read out circuit, in response to the drive signal provided by said drive circuit, adds together electrical charges of d×e pixels adjacent to each other and enables a read out of (m in a horizontal direction)×(n in a vertical direction) pixel signals.

5. An image-capturing device according to claim 4, further comprising:
   a selection unit that selects a mode for reading out the (m in a horizontal direction)×(n in a vertical direction) pixel signals or a mode for reading out the (d×m in a horizontal direction)×(e×n in a vertical direction) pixel signals without adding.

6. An image-capturing device according to claim 3, wherein:
   the green color filter, the blue color filter and the red color filter each achieve predefined spectral characteristics; and
   said read out circuit adds together electrical charges of the 4×c pixels adjacent to each other vertically and horizontally to read out a brightness signal.

7. An image-capturing element comprising:
   a plurality of pixels provided in a matrix, each having a photoelectric conversion element; and
   a plurality of color filters, each provided at one of said plurality of pixels, wherein:
   among said plurality of color filters, color filters of a single color are provided for pixels within each specific range and the color filters within the specific range have different transmissivities, and the color filters of the single color having different transmissivities from each other are provided adjacent to each other.

8. An image-capturing element according to claim 7, wherein:
   pixels at which the color filters of the single color have different transmissivities have identical spectral characteristics.

9. An image-capturing device, comprising:
   an image-capturing element having a plurality of pixels provided in a matrix each of which has a photoelectric conversion element, and a plurality of color filters being provided at the plurality of pixels respectively, the color filters being of a single color within each specific range, the color filters within said specific range having different transmissivities, the image-capturing element further having a read out circuit that adds together electrical charges of the pixels within said specific range and enables a sequential read out of added electrical charges; and
   a drive circuit that provides said read out circuit with a drive signal to enable said read out circuit to add together electrical charges of the pixels within said specific range and enables a sequential read out of added electrical charges.

10. An image-capturing device according to claim 9, wherein:
    said color filters of the single color having different transmissivities are provided adjacent to each other; and
    said read out circuit adds together electrical charges corresponding to color filters of the single color having different transmissivities and reads out added electrical charges.

11. An image-capturing device comprising:
    an image-capturing element having a plurality of pixels provided in a matrix pattern each of which has a photoelectric conversion element, a plurality of color filters being provided at said plurality of pixels respectively, and a read out circuit that enables a sequential read out of electrical charge signals of said pixels;
    a drive circuit that provides said read out circuit with a drive signal to enable said read out circuit to add electrical charge signals obtained from pixels with color filters thereof lying adjacent to each other, being of a single color and having the same transmissivity and then to enable a read out of added electrical charge signals, and also to enable said read out circuit to independently read out electrical charge signals obtained from the pixels with color filters thereof lying adjacent to each other, being of a single color and achieving different transmissivities without adding the electrical charge signals together; and a signal processing device that converts signals obtained from adjacent single color pixels with different transmissivities to one brightness signal by synthesizing the signals while ensuring that the signals continuously change in correspondence to an incident light quantity.

12. An image-capturing device according to claim 11, further comprising:

a selection unit that selects a first mode or a second mode, wherein:

when said first mode is selected, said drive circuit provides said read out circuit with a drive signal to enable said read out circuit to add electrical charge signals obtained from pixels with color filters thereof lying adjacent to each other being of a single color and having the same transmissivity and then to read out added electrical charge signals and also to enable said read out circuit to enable reading out electrical charge signals obtained from pixels with color filters thereof lying adjacent to each other being of a single color and having different transmissivities independently of each other without performing addition;

when said second mode is selected, said drive circuit provides said read out circuit with a drive signal to enable said read out circuit to generate a first added signal by adding together the electrical charge signals obtained from the pixels with the color filters thereof lying adjacent to each other being of a single color and having the same transmissivity, to enable said read out circuit to generate a second added signal by adding together the electrical charge signals obtained from the pixels with the color filters thereof lying adjacent to each other being of a single color and having different transmissivities, and also to enable said read out circuit to add said first added signal and said second added signal and enable a read out of an addition signal of said first added signal and said second added signal; and when said second mode is selected, said signal processing device stops synthesizing processing.

13. A driving method for an image-capturing element that has 2×a×m pixels along a horizontal direction and 2×b×n pixels along a vertical direction arranged in a matrix, each pixel having a photoelectric conversion element, the image capturing element having a color filter array in which color filters of a single color are arranged at every first pixel group that has 2×a pixels along a horizontal direction and 2×b pixels along a vertical direction adjacent to each other, a color arrangement of the color filters at every first pixel group achieving a Bayer array, the a, b, m and n each representing a natural number, the driving method comprising:

a step in which either a color image mode or a monochrome image mode is selected;

a step in which driving of the image-capturing element is implemented to add together individual pixels in the first pixel group for readout when the color image mode is selected; and a step in which driving of the image-capturing element is implemented to add together individual pixels in a second pixel group achieved by shifting by "a" pixels in the horizontal direction and by "b" pixels in the vertical direction relative to a position of the first pixel group for readout when the monochrome image mode is selected.

14. A driving method for an image-capturing element that has a plurality of pixels arranged in a matrix, each pixel having a photoelectric conversion element, the image capturing element having a color filter array in which color filters of a single color are arranged at every four pixels adjacent to each other in vertical and horizontal directions, a color arrangement of the color filters at every said four pixels achieving a Bayer array, the driving method comprising:

a step in which either a color image mode or a monochrome image mode is selected;

a step in which driving of the image-capturing element is implemented to add together said four pixels for readout when the color image mode is selected; and a step in which driving of the image-capturing element is implemented to add together other four pixels achieved by shifting by one pixel in the horizontal direction and by one pixel in the vertical direction relative to a position of said four pixels for readout when the monochrome image mode is selected.

15. An image-capturing device comprising:

an image-capturing element that has 2×a×m pixels along a horizontal direction and 2×b×n pixels along a vertical direction arranged in a matrix, each pixel having a photoelectric conversion element, the image capturing element having a color filter array in which color filters of a single color are arranged at every first pixel group that has 2×a pixels along a horizontal direction and 2×b pixels along a vertical direction adjacent to each other, a color arrangement of the color filters at every first pixel group achieving a Bayer array, the a, b, m and n each representing a natural number;

a switching device that selects either a color image mode or a monochrome image mode; and a drive control device that implements drive control of the image-capturing element to add together individual pixels in the first pixel group for readout when the color image mode is selected, and implements drive control of the image-capturing element to add together individual pixels in a second pixel group achieved by shifting by "a" pixels in the horizontal direction and by "b" pixels in the vertical direction relative to a position of the first pixel group for readout when the monochrome image mode is selected.

16. An image-capturing device comprising:

an image-capturing element that has a plurality of pixels arranged in a matrix, each pixel having a photoelectric conversion element, the image capturing element having a color filter array in which color filters of a single color are arranged at every four pixels adjacent to each other in vertical and horizontal directions, a color arrangement of the color filters at every said four pixels achieving a Bayer array;

a switching device that selects either a color image mode or a monochrome image mode; and a drive control device that implements drive control of the image-capturing element to add together said four pixels for readout when the color image mode is selected, implements drive control of the image-capturing element to add together other four pixels achieved by shifting by one pixel in the horizontal direction and by one pixel in the vertical direction relative to a position of said four pixels for readout when the monochrome image mode is selected.

17. An image-capturing device according to claim 15, further comprising:

a color image generating device that generates color image information by using an output signal from said image-capturing element when the color image mode is selected; and a monochrome image generating device that generates monochrome image information by using an output signal from said image-capturing element when the monochrome image mode is selected.

* * * * *